(12) United States Patent
Zhai et al.

(10) Patent No.: US 12,449,702 B2
(45) Date of Patent: Oct. 21, 2025

(54) LIGHT ADJUSTING STRUCTURE, LIGHT ADJUSTING MODULE AND LIGHT ADJUSTING DEVICE

(71) Applicants: BEIJING BOE SENSOR TECHNOLOGY CO., LTD., Beijing (CN); BOE TECHNOLOGY GROUP CO., LTD., Beijing (CN)

(72) Inventors: Deshen Zhai, Beijing (CN); Chunlei Wang, Beijing (CN); Sikai Zhang, Beijing (CN); Xiaoqian Ju, Beijing (CN); Zhan Li, Beijing (CN); Jing Pang, Beijing (CN); Kun Yang, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/686,386

(22) PCT Filed: Feb. 13, 2023

(86) PCT No.: PCT/CN2023/075619
§ 371 (c)(1),
(2) Date: Feb. 23, 2024

(87) PCT Pub. No.: WO2024/168453
PCT Pub. Date: Aug. 22, 2024

(65) Prior Publication Data
US 2025/0044651 A1    Feb. 6, 2025

(51) Int. Cl.
*G02F 1/1345* (2006.01)
*G02F 1/1339* (2006.01)
*G02F 1/1343* (2006.01)

(52) U.S. Cl.
CPC ........ *G02F 1/13452* (2013.01); *G02F 1/1339* (2013.01); *G02F 1/134309* (2013.01)

(58) Field of Classification Search
CPC ........... G02F 1/133351; G02F 1/13336; G02F 1/1347; G02F 1/134309; G02F 1/1339; G02F 1/13452
See application file for complete search history.

(56) References Cited

U.S. PATENT DOCUMENTS

| 2019/0331944 A1* | 10/2019 | Fang ................... G02B 6/0055 |
| 2022/0171228 A1* | 6/2022 | Nakamura ................ G09F 9/00 |
| 2022/0410672 A1 | 12/2022 | Hu et al. |

FOREIGN PATENT DOCUMENTS

| CN | 104808871 A | 7/2015 |
| CN | 106154616 B | 3/2019 |

(Continued)

OTHER PUBLICATIONS

PE2E English translation of CN111965905A (Year: 2020).*
The First Office Action dated Jun. 11, 2025 corresponding to Chinese application No. 202380008031.9.

*Primary Examiner* — Michael H Caley
*Assistant Examiner* — David Y Chung
(74) *Attorney, Agent, or Firm* — Nath, Goldberg & Meyer; Joshua B. Goldberg

(57) ABSTRACT

There is provided a light adjusting structure, a light adjusting module and a light adjusting device, the light adjusting structure includes one or two light adjusting functional layers stacked, each light adjusting functional layer includes functional sub-layers in different regions, first substrates and/or second substrates of the functional sub-layers constitute a full-layer planar substrate, one of first electrodes or second electrodes of the functional sub-layers are disposed at an interval, and the other one of the first electrodes or the second electrodes are disposed at an interval or constitute a (Continued)

full-layer planar electrode; dye liquid crystal layers of the functional sub-layers each include a sealant between the first alignment layer and the second alignment layer, and dye molecules and liquid crystal molecules in a space surrounded by the sealant; sealants of the functional sub-layers are disposed at an interval, and spaces surrounded by the sealants are isolated.

17 Claims, 11 Drawing Sheets

(56) References Cited

FOREIGN PATENT DOCUMENTS

| | | | | |
|---|---|---|---|---|
| CN | 109901339 A | 6/2019 | | |
| CN | 111624800 A | 9/2020 | | |
| CN | 111948856 A | 11/2020 | | |
| CN | 111965905 A | * 11/2020 | ........... | G02F 1/1333 |
| CN | 111983863 A | 11/2020 | | |
| CN | 111983865 A | 11/2020 | | |
| CN | 113156686 A | 7/2021 | | |
| CN | 113419371 A | 9/2021 | | |
| CN | 113960842 A | 1/2022 | | |
| CN | 114609820 A | 6/2022 | | |
| CN | 216817132 U | 6/2022 | | |
| JP | 2023018435 A | 2/2023 | | |
| WO | 2022236521 A1 | 11/2022 | | |

* cited by examiner

N-N (1)  (2)

LIGHT ADJUSTING STRUCTURE, LIGHT ADJUSTING MODULE AND LIGHT ADJUSTING DEVICE

This is a National Phase Application filed under 35 U.S.C. 371 as a national stage of PCT/CN2023/075619, filed Feb. 13, 2023, the content of which is hereby incorporated by reference in its entirety.

TECHNICAL FIELD

The present disclosure relates to the field of display technology, in particular to a light adjusting structure, a light adjusting module and a light adjusting device.

BACKGROUND

At present, dye liquid crystal light adjusting hollow glass assemblies (also called insulating glass unit, IGU) are widely applied in the fields of buildings, vehicles and the like, and can realize an adjustment of transmittance of visible light. In order to adapt to different scenes, a plurality of light adjusting functional layers (also called flexible printed circuit on glasses, FOGs) forming the IGU are to be spliced.

However, in the related art, each FOG is cut into two independent functional sub-layers which are then spliced, since appearance contours and sizes of the functional sub-layers are the same, a situation, that alignment directions of the functional sub-layers are confused after the functional sub-layers being stacked, inevitably occurs in an actual manufacturing process, and if the same IGU includes various combinations of a plurality of different alignment directions, during observing the IGU at a side viewing angle, differences may occur in transmittance and chromaticity, resulting in a poor uniformity of light adjusting. In addition, in the related art, the functional sub-layers are to be spliced, and the number of the functional sub-layers is relatively large, resulting in increased manufacturing cost and reduced production efficiency.

SUMMARY

The present disclosure is directed to solve at least one technical problem in the related art, and provides a light adjusting structure, a light adjusting module and a light adjusting device, which can solve the problem, in the related art, that alignment directions of functional sub-layers are confused after the functional sub-layers being stacked, so that the uniformity of light adjusting can be improved, the number of functional sub-layers to be spliced can be reduced, the manufacturing cost can be reduced, and the production efficiency can be improved.

To achieve the above object, an embodiment of the present disclosure provides a light adjusting structure, which includes one or two light adjusting functional layers stacked on top of each other, each light adjusting functional layer includes a plurality of functional sub-layers distributed in different regions, and each of the functional sub-layers includes a first substrate and a second substrate disposed opposite to each other, a first electrode and a second electrode respectively disposed on sides of the first substrate and the second substrate facing each other, a first alignment layer and a second alignment layer respectively disposed on sides of the first electrode and the second electrode facing each other, and a dye liquid crystal layer between the first alignment layer and the second alignment layer, at least one of first substrates or second substrates of the functional sub-layers constitute a full-layer planar substrate, one of first electrodes or second electrodes of the functional sub-layers are disposed at an interval, and the other one of first electrodes or second electrodes of the functional sub-layers are disposed at an interval or constitute a full-layer planar electrode, dye liquid crystal layers of the functional sub-layers each include a sealant disposed between the first alignment layer and the second alignment layer in a surrounding mode, and dye molecules and liquid crystal molecules disposed in a space surrounded by the sealant, sealants of the functional sub-layers are disposed at an interval, and spaces surrounded by the sealants of the functional sub-layers are isolated from each other.

In some implementations, for two light adjusting functional layers stacked on top of each other, alignment directions of the first alignment layer and the second alignment layer of each functional sub-layer in one light adjusting functional layer are respectively a first direction and a second direction which are parallel and opposite to each other; alignment directions of the first alignment layer and the second alignment layer of each functional sub-layer in the other light adjusting functional layer are respectively a third direction and a fourth direction which are parallel and opposite to each other.

In some implementations, the first direction and the second direction are perpendicular to the third direction and the fourth direction.

In some implementations, first alignment layers of the functional sub-layers are disposed at an interval, and second alignment layers of the functional sub-layers are disposed at an interval.

In some implementations, an interval between one of the first electrodes or the second electrodes of the functional sub-layers is greater than or equal to 2 mm and less than or equal to 4 mm, an interval between the sealants of the functional sub-layers is greater than or equal to 2 mm and less than or equal to 4 mm, an interval between the first alignment layers of the functional sub-layers is greater than or equal to 2 mm and less than or equal to 4 mm, and an interval between the second alignment layers of the functional sub-layers is greater than or equal to 2 mm and less than or equal to 4 mm.

In some implementations, a transparent insulating colloid is disposed in the interval between one of the first electrodes or the second electrodes of the functional sub-layers, and in the interval between the sealants of the functional sub-layers.

In some implementations, each of the first electrodes and the second electrodes of the functional sub-layers are provided with at least one bonding part, outside a transmittance adjusting region where the electrodes are located, for bonding with a flexible circuit board.

In some implementations, the light adjusting functional layer includes three functional sub-layers, at least one of the first electrodes or the second electrodes of the functional sub-layers are disposed at an interval, and include a first electrode region, a second electrode region and a third electrode region, and the first electrode region and the second electrode region are disposed on a same side of the third electrode region, one bonding part is provided and is disposed on a side of the first electrode region and the second electrode region away from the third electrode region, the third electrode region is provided with an extension part, and an end of the extension part passes through the interval between the first electrode region and the second electrode region and extends to the side where the bonding part is located, the bonding part includes three bonding sub-parts which are spaced apart from each other, the first electrode region and the second electrode region and the extension part are bonded with the flexible circuit board through the three bonding sub-parts respectively.

In some implementations, the light adjusting functional layer includes three functional sub-layers, at least one of the first electrodes or the second electrodes of the functional sub-layers are disposed at an interval, and include a first electrode region, a second electrode region and a third electrode region, and the first electrode region and the second electrode region are disposed on a same side of the third electrode region, one bonding part is provided and is disposed on a side of the first electrode region and the third electrode region away from the first electrode region or the second electrode region, the first electrode region or the second electrode region is provided with an extension part, and an end of the extension part passes through the interval between the second electrode region and the third electrode region or the interval between the first electrode region and the third electrode region and extends to the side where the bonding part is located, the bonding part includes three bonding sub-parts which are spaced apart from each other, the second electrode region, the third electrode region and the extension part, or the first electrode region, the third electrode region and the extension part are respectively bonded with the flexible circuit board through the three bonding sub-parts respectively.

In some implementations, the light adjusting functional layer includes three functional sub-layers, at least one of the first electrodes or the second electrodes of the functional sub-layers are disposed at an interval, and the three functional sub-layers are respectively a first electrode region, a second electrode region and a third electrode region, and the first electrode region and the second electrode region are disposed on a same side of the third electrode region, two bonding parts are provided, one bonding part is a first bonding part and is disposed on the side, away from the third electrode region, of the first electrode region and the second electrode region, and the other bonding part is a second bonding part and is disposed on a side, away from the first electrode region or the second electrode region, of the third electrode region, the first bonding part includes two bonding sub-parts which are spaced apart from each other, and the first electrode region and the second electrode region are respectively bonded with one flexible circuit board through the two bonding sub-parts, and the third electrode region is bonded to another flexible circuit board by the second bonding part.

In some implementations, the bonding part provided for the first electrodes of the functional sub-layers is a first electrode bonding part, the bonding part provided for the second electrodes of the functional sub-layers is a second electrode bonding part, the second electrode bonding part is disposed opposite to the first electrode bonding part, the flexible circuit board has a contact part disposed between the first electrode bonding part and the second electrode bonding part, the contact part includes a first contact surface and a second contact surface facing away from each other, the first contact surface faces the first electrode bonding part, and the second contact surface faces the second electrode bonding part, at least one first bonding terminal electrically contacting the first electrode bonding part is disposed on the first contact surface, and the first electrode of at least one of the functional sub-layers is electrically conducted with the flexible circuit board through at least one first bonding terminal, the second contact surface is provided with at least one second bonding terminal electrically contacting the second electrode bonding part, and the second electrode of at least one of the functional sub-layers is electrically conducted to the flexible circuit board through at least one second bonding terminal.

In some implementations, a protective colloid is disposed at an interface between the contact part and the first electrode bonding part, the second electrode bonding part.

In some implementations, a shape of an outer contour of the bonding part is a rectangle, and a length of the rectangle is greater than or equal to 30 mm and less than or equal to 60 mm, a width of the rectangle is greater than or equal to 6 mm and less than or equal to 15 mm.

In some implementations, an interval between the extension part and each the electrode regions that the extension part passes therethrough is greater than or equal to 40 μm and less than or equal to 80 μm.

In some implementations, a space between every two bonding sub-parts adjacent to each other is greater than or equal to 0.1 mm, and less than or equal to 1 mm.

As another technical solution, the present disclosure further provides a light adjusting structure, which includes one or two light adjusting functional layers stacked, each light adjusting functional layer includes a plurality of functional sub-layers distributed in different regions, and each of the functional sub-layers includes a first substrate and a second substrate disposed opposite to each other, a first electrode and a second electrode respectively disposed on sides of the first substrate and the second substrate facing each other, a first alignment layer and a second alignment layer respectively disposed on sides of the first electrode and the second electrode facing each other, and a dye liquid crystal layer between the first alignment layer and the second alignment layer, the first substrates of the functional sub-layers constitute a full-layer planar substrate, and the second substrates of the functional sub-layers constitute a full-layer planar substrate, one of the first electrodes or the second electrodes of the functional sub-layers are disposed at an interval, and the other one of the first electrodes or the second electrodes of the functional sub-layers are disposed at an interval or constitute a full-layer planar electrode, an interval between one of the first electrodes or the second electrodes of the functional sub-layers is greater than or equal to 2 mm and less than or equal to 4 mm.

As another technical solution, the present disclosure further provides a light adjusting module, which includes the light adjusting structure provided in the present disclosure, and further includes a first protective layer and a second protective layer disposed opposite to each other, and the light adjusting structure is disposed between the first protective layer and the second protective layer.

In some implementations, the light adjusting structure is fixed to the first protective layer and the second protective layer through two first transparent adhesive layers respectively, or the light adjusting structure is fixed to the first protective layer through a first transparent adhesive layer, and the light adjusting structure and the second protective layer are disposed at an interval, the first transparent adhesive layer is a full-layer planar adhesive layer.

In some implementations, the light adjusting structure includes two light adjusting functional layers fixed through a second transparent adhesive layer, the second transparent adhesive layer is a full-layer planar adhesive layer.

In some implementations, the light adjusting module includes a plurality of light adjusting structures spliced together.

In some implementations, the first electrodes of the functional sub-layers are disposed at an interval, and the second electrodes of the functional sub-layers are disposed at an interval, the light adjusting module further includes a plurality of first flexible circuit boards correspondingly bonded with the first electrodes of the functional sub-layers, and a plurality of second flexible circuit boards correspondingly bonded with the second electrodes of the functional sub-layers, or, the first electrodes of the functional sub-layers are disposed at an interval, and the second electrodes of the functional sub-layers constitute a full-layer planar electrode, the light adjusting module further includes a plurality of first flexible circuit boards correspondingly bonded with the first electrodes of functional sub-layers, and one second flexible circuit board bonded with the full-layer planar electrode.

In some implementations, the light adjusting structure is fixed to the first protective layer and the second protective layer through two first transparent adhesive layers respectively, the light adjusting structure includes one light adjusting functional layer, the light adjusting module further includes a sealant between the first protective layer and the second protective layer and surrounding the light adjusting structure, a buffer adhesive tape is disposed between the sealant and the two first transparent adhesive layers in a surrounding mode.

In some implementations, a thickness of the sealant satisfies a following relation: $T3=T2+2\times T1$, T3 is the thickness of the sealant, T2 is a thickness of the light adjusting structure, T1 is a thickness of the buffer adhesive tape, and the thickness of the buffer adhesive tape is equal to a thickness of the first transparent adhesive layer.

In some implementations, the thickness of the light adjusting structure is greater than or equal to 0.1 mm and less than or equal to 0.4 mm, the thickness of the buffer adhesive tape is 0.4 mm, or 0.5 mm, or 0.6 mm, or 0.8 mm, or 1.1 mm.

In some implementations, the light adjusting module further includes a transparent display panel, the transparent display panel is disposed between the light adjusting structure and one of the first transparent adhesive layers, and is located in the region where one of the functional sub-layers of the light adjusting functional layer is located, and the first transparent adhesive layer is configured to eliminate a height difference between the transparent display panel and the light adjusting structure; the transparent display panel is fixed to the light adjusting structure through a second transparent adhesive layer.

In some implementations, a sealant of the transparent display panel is a transparent colloid.

In some implementations, the transparent display panel is a flexible transparent display panel.

As another technical solution, the present disclosure further provides a light adjusting device, applied to any one of a lighting roof, a curtain wall, a passenger vehicle, a rail vehicle, an airplane and a ship, the adjusting device includes the light adjusting module provided by the present disclosure.

In some implementations, the light adjusting module includes the light adjusting structure provided by the present disclosure, the light adjusting device is applied to roof panes of a passenger vehicle, the first electrode region, the second electrode region and the third electrode region respectively correspond to a main driver zone, a passenger seat zone and a back seat zone in an inner space of the passenger vehicle.

In some implementations, the light adjusting module further includes a transparent display panel, the transparent display panel is disposed between the light adjusting structure and one of the first transparent adhesive layers, and is located in the region where one of the functional sub-layers of the light adjusting functional layer is located, and the first transparent adhesive layer is configured to eliminate a height difference between the transparent display panel and the light adjusting functional layer, the transparent display panel is fixed to the light adjusting structure through a second transparent adhesive layer, the transparent display panel is located in the region in which the functional sub-layer corresponding to the back seat zone is located.

DETAILED DESCRIPTION

Figure 1:
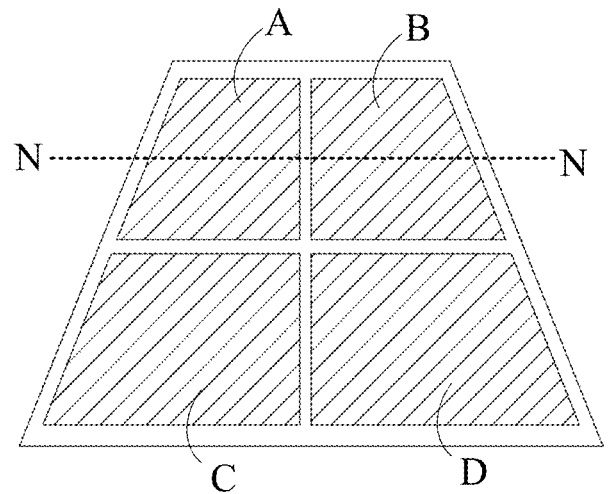
FIG. 1 is a schematic diagram of splicing of a plurality of light adjusting functional layers in a conventional light adjusting structure.

In order to make objects, technical solutions and advantages of the present disclosure more apparent, the present disclosure will be described in further detail with reference to the accompanying drawings. All other embodiments, which can be obtained by a person skilled in the art without any creative effort based on the embodiments in the present disclosure, belong to the protection scope of the present disclosure.

The shapes and sizes of the components in the drawings are not to scale, but are merely intended to facilitate an understanding of the contents of the embodiments of the present disclosure.

Unless defined otherwise, technical or scientific terms used herein shall have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Also, the use of the terms "a," "an," or "the" and similar referents does not denote a limitation of quantity, but rather denotes the presence of at least one. The word "comprising/including" or "comprise/include", and the like, means that the element or item preceding the word contains the element or item listed after the word and its equivalent, but does not exclude other elements or items. The terms "connected" or "coupled" and the like are not restricted to physical or mechanical connections, but may include electrical connections, whether direct or indirect. Terms "upper", "lower", "left", "right", and the like are used only to indicate relative positional relationships, and when the absolute position of the object being described is changed, the relative positional relationships may be changed accordingly.

The embodiments of the present disclosure are not limited to the embodiments shown in the drawings, but include modifications of configurations formed based on a manufacturing process. Thus, the regions illustrated in the figures have schematic properties, and the shapes of the regions shown in the figures illustrate specific shapes of regions of elements, but are not intended to be limiting.

In the related art, as shown in FIG. 1, taking an IGU being formed by splicing four FOGs as an example, the four FOGs are respectively distributed in four different regions (A to D), two FOG1 distributed in regions A and B have the same size; two FOG2 distributed in regions C and D have the same size, but the two FOG1 distributed in regions A and B are different in size from the two FOG2 distributed in regions C and D.

Figure 2:
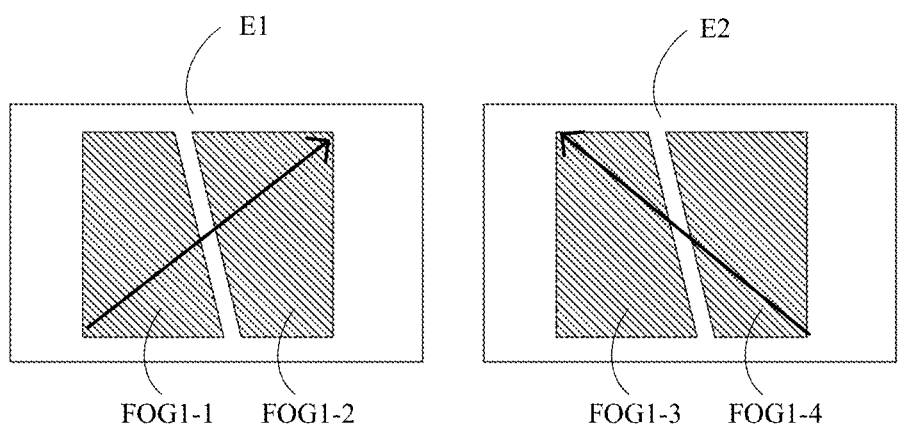
FIG. 2 is a diagram illustrating a comparison between alignment directions of two dye liquid crystal mother substrates.
Figure 3:
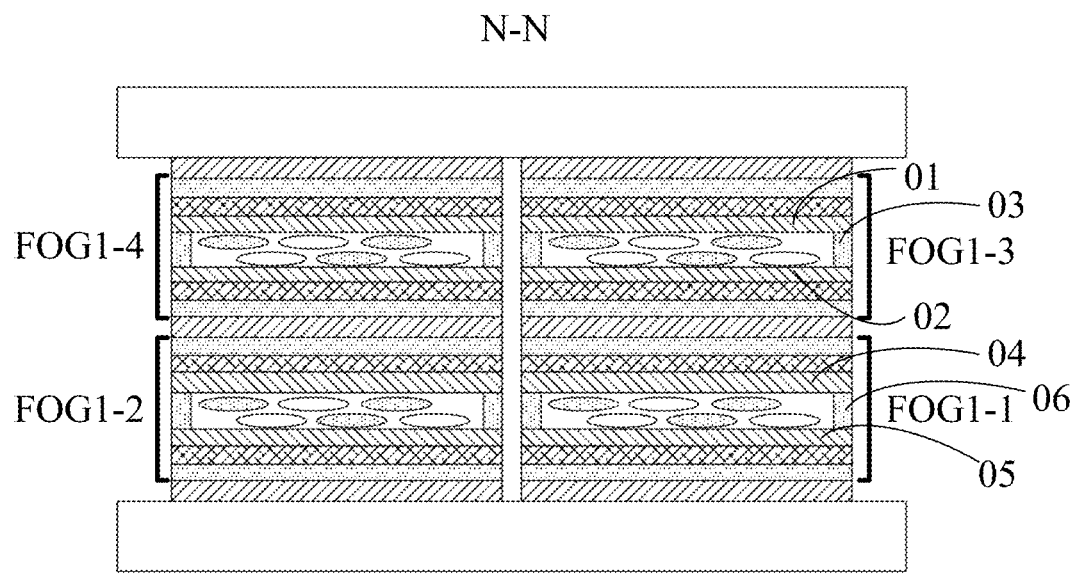
FIG. 3 is a cross-sectional view taken along line N-N of FIG. 1.

It is found through studies that, taking the two FOG1 distributed in the regions A and B as an example, as shown in FIG. 2, the two FOG1 are fabricated by cutting two entire layer structures of FOG1, i.e., two dye liquid crystal mother substrates (E1, E2), with one dye liquid crystal mother substrate E1 being cut into two functional sub-layers FOG1-1 and FOG1-2, and the other dye liquid crystal mother substrate E2 being cut into two functional sub-layers FOG1-3 and FOG1-4. As shown in FIG. 3, the two functional sub-layers FOG1-3 and FOG1-4 are respectively stacked with the two functional sub-layers FOG1-1 and FOG1-2, and alignment directions of two alignment layers in each functional sub-layer are parallel and opposite to each other. For any two functional sub-layers stacked, taking the two functional sub-layers FOG1-1 and FOG1-3 as an example, the functional sub-layer FOG1-3 includes a first alignment layer 01 and a second alignment layer 02 that are oppositely disposed on both sides of a dye liquid crystal layer 03 respectively in a vertical direction in FIG. 3, and the functional sub-layer FOG1-1 includes a first alignment layer 04 and a second alignment layer 05 that are oppositely disposed on both sides of a dye liquid crystal layer 06 respectively in the vertical direction in FIG. 3. An alignment direction of the first alignment layer 01 and an alignment direction of the second alignment layer 02 are parallel and opposite to each other; an alignment direction of the first alignment layer 04 and an alignment direction of the second alignment layer 05 are parallel and opposite to each other; the first alignment layer 01 and the first alignment layer 04 are both disposed on a same side of respective corresponding dye liquid crystal layers (i.e., an upper side of the dye liquid crystal layers shown in FIG. 3), the second alignment layer 02 and the second alignment layer 05 are both disposed on a same side of the respective corresponding dye liquid crystal layers (i.e., a lower side of the dye liquid crystal layers shown in FIG. 3), and alignment directions of the first alignment layer 01 and the second alignment layer 02 are perpendicular to alignment directions of the first alignment layer 04 and the second alignment layer 05, so that the IGU product can achieve the darkest effect in the dark state. Specifically, before cutting, alignment directions of the first alignment layer 01, the second alignment layer 02, the first alignment layer 04, and the second alignment layer 05 in the two dye liquid crystal mother substrates (E1, E2) are as shown in FIG. 2, and after cutting, the four functional sub-layers are spliced so that the alignment directions of the four alignment layers are as above.

Figure 4:
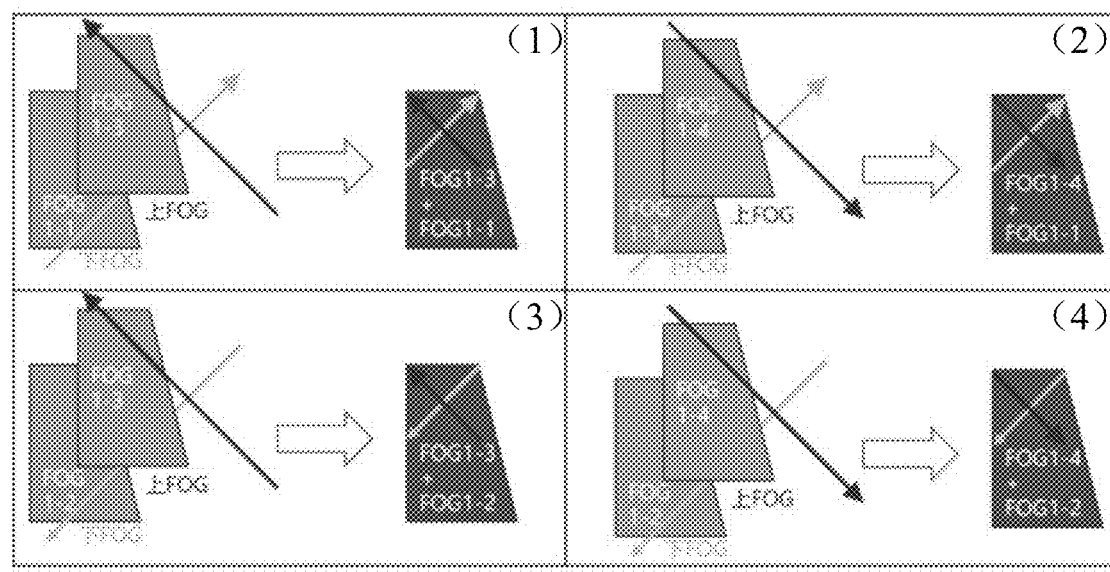
FIG. 4 is a diagram illustrating a comparison between combinations of alignment directions of four functional sub-layers.

However, the problem, that a difference between the alignment directions of the four alignment layers may cause a difference in chromaticity, is not noticed in the related art, and since appearance outer contours of the four functional sub-layers FOG1-1, FOG1-2, FOG1-3 and FOG1-4 are the same, and sizes of the four functional sub-layers FOG1-1, FOG1-2, FOG1-3 and FOG1-4 are the same, a situation, that the alignment directions of the four alignment layers are confused after the four functional sub-layers are stacked, inevitably occurs in an actual manufacturing process, for example, as shown in (1) to (4) of FIG. 4, various combinations of the alignment directions of the four functional sub-layers FOG1-1, FOG1-2, FOG1-3 and FOG1-4 exist. If there are multiple different combinations of the alignment directions for the same IGU, during the IGU being observed at a side viewing angle, and differences in transmittance and chromaticity may occur, resulting in a poor uniformity of light adjusting. In addition, in the related art, the four functional sub-layers are spliced, and the number of functional sub-layers to be spliced is relatively large, so that the manufacturing cost is increased, and the production efficiency is reduced.

Figure 5:
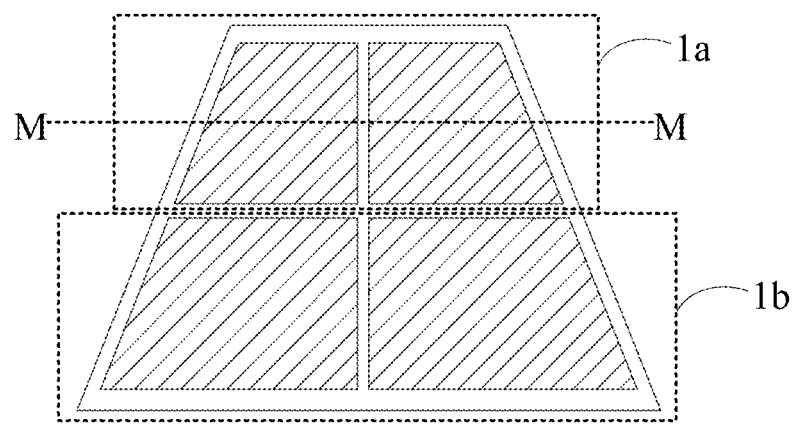
FIG. 5 is a schematic diagram of splicing of a plurality of light adjusting structures in a light adjusting module according to an embodiment of the present disclosure.
Figure 6:
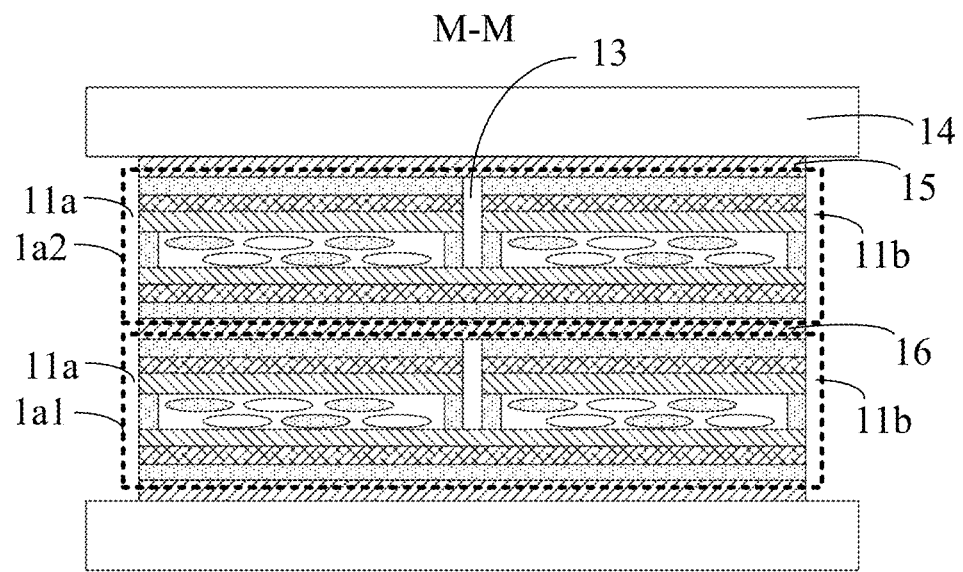
FIG. 6 is a cross-sectional view taken along line M-M of FIG. 5.

An embodiment of the present disclosure provides a light adjusting module including a plurality of light adjusting structures, which are spliced, and for example, as shown in FIG. 5, the light adjusting module includes two light adjusting structures, i.e., a first light adjusting structure 1a and a second light adjusting structure 1b, and a shape of an outer contour of the two light adjusting structures after being spliced includes any shape such as an isosceles trapezoid, a square, a rectangle, and the like. The first light adjusting structure 1a and the second light adjusting structure 1b include the same functional layers, but have different sizes. Taking the first light adjusting structure 1a as an example, as shown in FIG. 6, the first light adjusting structure 1a includes two light adjusting functional layers (1a1, 1a2) stacked on top of each other, but the embodiment of the present disclosure is not limited thereto, and in practical applications, the number of the light adjusting structures and the shape of the outer contour of the spliced light adjusting structures may be freely set according to different application scenarios, or the light adjusting module may include one light adjusting structure. In addition, each light adjusting structure is not limited to including two light adjusting functional layers (1a1, 1a2), and may include one light adjusting functional layer.

An embodiment of the present disclosure further provides a light adjusting structure, which can be included in the light adjusting module provided by the embodiment of the present disclosure. In particular, each light adjusting functional layer in the light adjusting structure includes a plurality of functional sub-layers distributed in different regions. The regions here refer to regions that are divided by referring to regions for differently adjusting the transmittance of the light adjusting functional layer, so that the functional sub-layers in different regions can be controlled independently to achieve light adjusting region by region, for example, a certain region can be selectively lightened to perform light adjusting locally, and other regions are kept in a transparent or dark state. In particular, electrodes in the functional sub-layers in different regions may be applied with different voltages thereon to independently control the functional sub-layers in different regions.

Figure 7:
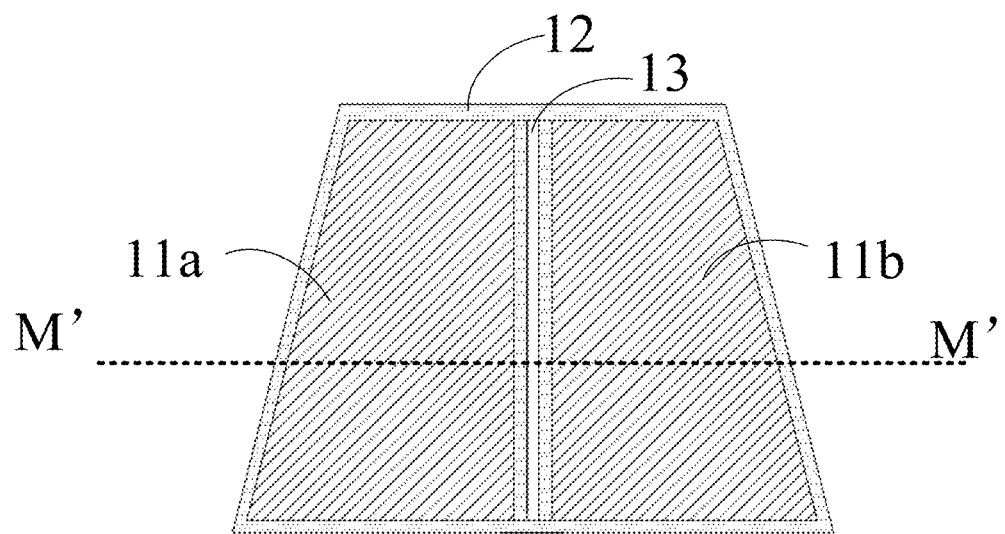
FIG. 7 is a plan view of a light adjusting functional layer according to an embodiment of the present disclosure.

Taking the two light adjusting functional layers (1a1, 1a2) stacked shown in FIG. 6 as an example, as shown in FIG. 7, each light adjusting functional layer includes two functional sub-layers (11a, 11b), the functional sub-layer 11a in the light adjusting functional layer 1a1 is stacked with the functional sub-layer 11a in the light adjusting functional layer 1a2, and the functional sub-layer 11b in the light adjusting functional layer 1a1 is stacked with the functional sub-layer 11b in the light adjusting functional layer 1a2. In some implementations, the shape of the outer contour of each light adjusting functional layer is an isosceles trapezoid, but in practical applications, may be any other shape such as a square, a rectangle, or the like. Taking the shape of the outer contour of each light adjusting functional layer being an isosceles trapezoid as an example, the two functional sub-layers (11a, 11b) are symmetrically distributed with respect to a center line of the isosceles trapezoid. Thus, a boundary between the two functional sub-layers (11a, 11b) is a middle line of the isosceles trapezoid, which is different from a cutting line between the two functional sub-layers FOG1-1 and FOG1-2 in the related art (as shown in FIG. 2, the cutting line is not the middle line of an isosceles trapezoid). The difference is caused by that the two functional sub-layers (11a, 11b) in the embodiment of the present disclosure are not independent from each other, and the specific structure is described in detail below.

Figure 8:
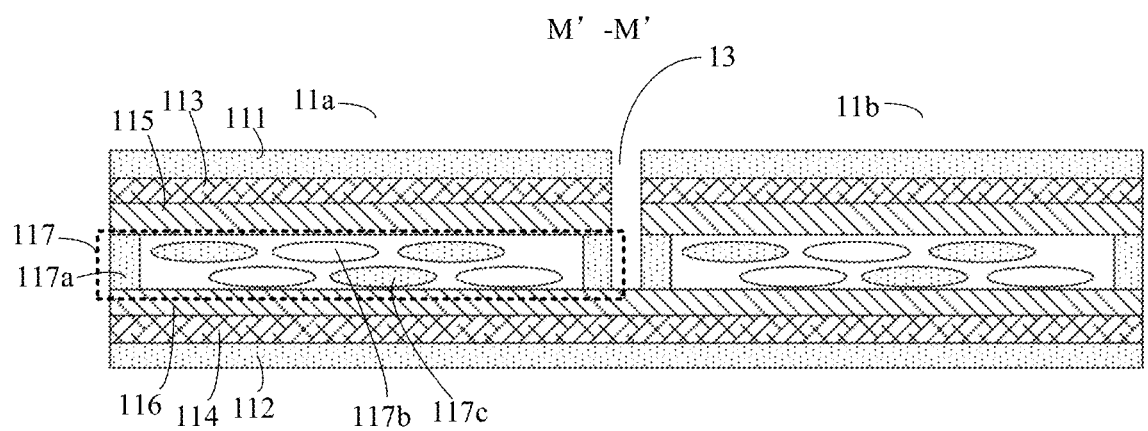
FIG. 8 is a cross-sectional view taken along line M'-M' of FIG. 7.

Referring to FIG. 8, taking the light adjusting functional layer including two functional sub-layers (11a, 11b) as an example, each functional sub-layer includes: a first substrate 111 and a second substrate 112 disposed opposite to each other; a first electrode 113 and a second electrode 114 respectively disposed on sides of the first substrate 111 and the second substrate 112 facing each other; a first alignment layer 115 and a second alignment layer 116 respectively disposed on sides of the first electrode 113 and the second electrode 114 facing each other; and a dye liquid crystal layer 117 between the first alignment layer 115 and the second alignment layer 116; at least one of first substrates 111 or second substrates 112 of the two functional sub-layers (11a, 11b) are formed into a full-layer planar substrate, and each dye liquid crystal layer 117 of the two functional sub-layers (11a, 11b) includes a sealant 117a disposed between the first alignment layer 115 and the second alignment layer 116 in a surrounding manner, and liquid crystal molecules 117b and dye molecules 117c disposed in a space surrounded by the sealant 117a; sealants 117a of the two functional sub-layers (11a, 11b) are disposed at an interval, and spaces surrounded by the sealants 117a of the two functional sub-layers (11a, 11b) are isolated from each other.

For example, the second substrate 112 in FIG. 8 is a full-layer planar substrate; one of first electrodes 113 or second electrodes 114 of the two functional sub-layers (11a, 11b) are disposed at an interval, and the other one of the first electrodes 113 or the second electrodes 114 of the two functional sub-layers (11a, 11b) are disposed at an interval or constitute a full-layer planar electrode. For example, in FIG. 8, the first electrodes 113 of the two functional sub-layers (11a, 11b) are provided at an interval, and the second electrode 114 is a full-layer planar electrode. It should be noted that film layers of the two functional sub-layers (11a, 11b) are disposed in layers in a one-to-one correspondence.

In the related art, a plurality of strip electrodes disposed at an interval may be formed inside each single functional sub-layer through sputtering, the interval between every two adjacent strip electrodes is relatively small, and generally the problem of light leakage between the electrodes can be weakened in a case where the interval is within a range from 1 micrometer to 10 micrometers. In contrast, in the light adjusting structure provided in the embodiment of the present disclosure, on the basis that at least one of the first substrates 111 or the second substrates 112 of the two functional sub-layers (11a, 11b) are formed into a full-layer planar substrate, one of the first electrodes 113 or the second electrodes 114 of the two functional sub-layers (11a, 11b) are disposed at an interval, and the sealants 117a of the two functional sub-layers (11a, 11b) are disposed at an interval, so that the interval between the electrodes and the interval between the sealants are respectively greater than those in the related art, and there is no problem of light leakage. In other words, the "interval" in the embodiment of the present disclosure is still equivalent to the interval, at a position of splicing, between the two independent functional sub-layers in the related art, but the interval in the embodiment of the present disclosure is less than the interval between the two independent functional sub-layers adjacent to each other in the related art, for example, less than the interval between the functional sub-layer FOG1-1 and the functional sub-layer FOG1-4 in FIG. 3, and in some implementations, the interval is, for example, greater than or equal to 2 mm and less than or equal to 4 mm, and is much greater than an interval (1 micrometer to 10 micrometers) between every adjacent strip electrodes inside each single functional sub-layer in the related art.

Figure 9:
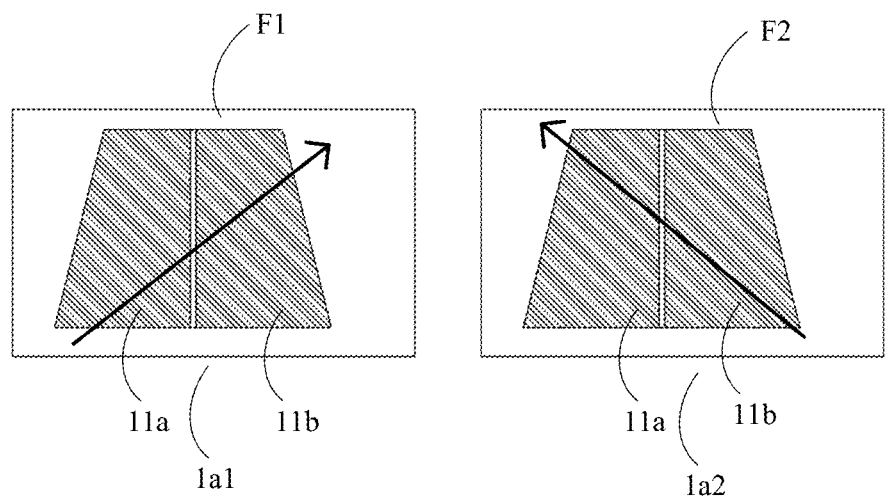
FIG. 9 is a diagram illustrating a comparison between alignment directions of two dye liquid crystal mother substrates according to an embodiment of the present disclosure.

Here, at least one of the first substrates or the second substrates of the functional sub-layers constitute a full-layer planar substrate, which means that the functional sub-layers share one full-layer planar substrate as the first substrates thereof and/or share another full-layer planar substrate as the second substrates thereof. By adopting the full-layer planar substrate as a common/shared substrate of the functional sub-layers, the light adjusting functional layer composed of the functional sub-layers is in an integrated structure, that is, the functional sub-layers are not independent, compared with the structure formed by splicing four independent functional sub-layers in the related art, during manufacturing the light adjusting module, as shown in FIG. 6, the light adjusting functional layer is to be fixed on a protective layer (such as a toughened glass) 14 through a full-layer planar transparent adhesive layer 15, and for a case in which two light adjusting functional layers are included in the light adjusting module, the two light adjusting functional layers (1a1, 1a2) are to be stacked and fixed together through a full-layer planar transparent adhesive layer 16, and the functional sub-layers in the same light adjusting functional layer are not to be spliced. As shown in FIG. 9, entire layer structures (F1, F2) respectively including the two light adjusting functional layers (1a1, 1a2) may be called dye liquid crystal mother substrates. The two entire layer structures (F1, F2) are respectively cut so that the two entire layer structures (F1, F2) each have an outer contour of a preset shape, such as an isosceles trapezoid. During cutting, the two entire layer structures (F1, F2) may be cut along the outer contour of the preset shape, for example, mechanical cutting may be employed. After cutting, the light adjusting functional layer shown in FIG. 7 is obtained, and the sealant 12 is disposed around the outer contour of the light adjusting functional layer. Then, the two light adjusting functional layers (1a1, 1a2) are to be fixed on a protective layer 14 through the full-layer planar transparent adhesive layer 15, and the two light adjusting functional layers (1a1, 1a2) are stacked and fixed together through the full-layer planar transparent adhesive layer 16, the two functional sub-layers (11a, 11b) in the same light adjusting functional layer are not to be spliced, so that the situation, that the alignment directions of the four functional sub-layers are confused after the four functional sub-layers being stacked, in the related art is avoided, the alignment directions of different regions are consistent, and therefore, no difference in transmittance and chromaticity exist in the observation at any viewing angle, and further, the uniformity of light adjusting can be improved. Moreover, since the functional sub-layers are not to be spliced, the number of functional sub-layers to be spliced can be reduced, the manufacturing cost can be reduced, and the production efficiency can be improved.

In order to realize light adjusting region by region and achieve the above-described effects, one of the first electrodes or the second electrodes of the functional sub-layers are disposed at an interval, and the other one of the first electrodes or the second electrodes of the functional sub-layers are disposed at an interval or constitute a full-layer planar electrode, so that different voltages can be independently applied to the one of the first electrodes or the second electrodes of the functional sub-layers in different regions, thereby realizing light adjusting region by region. In addition, the other one of the first electrodes or the second electrodes of the functional sub-layers being independent from each other or constituting a full planar electrode may be used as a common electrode.

In some implementations, taking the two light adjusting functional layers (1a1, 1a2) stacked shown in FIG. 6 as an example, as shown in FIG. 8, the alignment direction of the first alignment layers 115 and the alignment direction of the second alignment layers 116 of the two functional sub-layers (11a, 11b) in the light adjusting functional layer 1a1 are respectively a first direction and a second direction which are parallel to each other. In addition, for the same light adjusting functional layer, taking the light adjusting functional layer 1a1 as an example, alignment directions of first alignment layers 115 of the two functional sub-layers (11a, 11b) are the same, that is, each are the first direction; alignment directions of second alignment layers 116 of the two functional sub-layers (11a, 11b) are the same, i.e., each are the second direction. The alignment directions of the first alignment layers 115 and the second alignment layers 116 of the two functional sub-layers (11a, 11b) in the light adjusting functional layer 1a2 stacked together with the light adjusting functional layer 1a1 are respectively a third direction and a fourth direction parallel to each other. In some implementations, the first direction and the second direction are perpendicular to the third direction and the fourth direction, which allows the IGU product to achieve the darkest effect in the dark state. Specifically, before splicing, the alignment directions of the first alignment layers 115 and the second alignment layers 116, in the two functional sub-layers (11a, 11b) of each of the two light adjusting functional layers (1a1, 1a2), in the two dye liquid crystal mother substrates, i.e., the two entire layer structures (F1, F2), are as shown in FIG. 9, and after the two light adjusting functional layers (1a1, 1a2) are stacked, the alignment directions of the alignment layers as described above can be obtained.

In some implementations, taking the light adjusting functional layer including two functional sub-layers (11a, 11b) as an example, the first alignment layers 115 of the two functional sub-layers (11a, 11b) in FIG. 8 are disposed at an interval, and the second alignment layers 116 of the two functional sub-layers (11a, 11b) are disposed at an interval. In practical applications, as desired, the first alignment layers of the functional sub-layers may be independent from each other, or constitute a full-layer planar alignment layer; the second alignment layers of the functional sub-layers may be independent from each other, or constitute another full-layer planar alignment layer.

In some implementations, the interval between one of the first electrodes 113 or the second electrodes 114 of the two functional sub-layers (11a, 11b) is greater than or equal to 2 mm and less than or equal to 4 mm, for example, greater than or equal to 1 mm and less than or equal to 2 mm; the interval between the sealants 117a of the two functional sub-layers (11a, 11b) is greater than or equal to 2 mm and less than or equal to 4 mm, for example, greater than or equal to 1 mm and less than or equal to 2 mm. The interval between the first alignment layers 115 of the two functional sub-layers (11a, 11b) is not less than 2 mm and not greater than 4 mm, for example, not less than 1 mm and not greater than 2 mm; the interval between the second alignment layers 116 of the two functional sub-layers (11a, 11b) is not less than 2 mm and not greater than 4 mm, for example, not less than 1 mm and not greater than 2 mm. By setting the above-mentioned intervals within the numerical ranges mentioned above, not only an isolation between the electrodes, between the alignment layers, and between the dye liquid crystal layers of different functional sub-layers is achieved, but also the intervals within the numerical ranges are less than the interval, in the related art, between two independent functional sub-layers adjacent to each other, for example, are less than the interval between the functional sub-layer FOG1-1 and the functional sub-layer FOG1-4 in FIG. 3.

The light adjusting structure provided in the embodiment of the present disclosure may have different structures/configurations due to being manufactured by different methods. For example, as shown in FIG. 8, the first substrates 111 of the two functional sub-layers (11a, 11b) are disposed at an interval, and the second substrates 112 of the two functional sub-layers (11a, 11b) are formed into a full-layer planar substrate. It should be noted that, in FIG. 8, the first substrates 111 are disposed on an upper side of dye liquid crystal layers 117, and the second substrates 112 are disposed on a lower side of the dye liquid crystal layers 117. Correspondingly, the first electrodes 113 of the two functional sub-layers (11a, 11b) are disposed at an interval, that is, each of the two first substrates 111 and the two first electrodes 113 on the same side of the dye liquid crystal layers 117 are independent from each other, so that an entire layer of the first substrates 111 and an entire layer of the first electrodes 113 each can be cut conveniently from one side, and an entire layer of the second substrates 112 and an entire layer of the second electrodes 114 on the other side are not cut, that is, partial cutting is realized, so that the first substrates 111 of the two functional sub-layers (11a, 11b) can be disposed at an interval, and the second substrates 112 of the two functional sub-layers (11a, 11b) are formed into an integral light adjusting functional layer in a form of a full-layer planar substrate.

In some implementations, the first substrates 111 of the two functional sub-layers (11a, 11b) and the first electrodes 113 of the two functional sub-layers (11a, 11b) are formed by a single mechanical cutting process. That is, with the single mechanical cutting process, multiple film layers can be cut, so that such cutting method is relatively simple, and is lower in processing cost. As shown in FIGS. 6 and 7, after the entire layer of the first substrates 111 and the entire layer of the first electrodes 113 are subjected to the cutting process, an interval 13 is formed at a position of cutting, and the interval 13 is in a dye-free liquid crystal region (i.e., no dye molecule is in the region). In some implementations, the interval 13 is greater than or equal to 2 mm and less than or equal to 4 mm, for example, greater than or equal to 1 mm and less than or equal to 2 mm, so as to isolate the electrodes of different functional sub-layers from each other and isolate the dye liquid crystal layers of different functional sub-layers from each other.

In some implementations, taking the light adjusting functional layer including two functional sub-layers (11a, 11b) as an example, the first alignment layers 115 of the two functional sub-layers (11a, 11b) are disposed at an interval or constitute a full-layer planar alignment layer, the two first alignment layers 115 in FIG. 8 are disposed at an interval, the second alignment layers 116 of the two functional sub-layers (11a, 11b) are disposed at an interval or constitute a full-layer planar alignment layer, and the two second alignment layers 116 in FIG. 8 constitute a full-layer planar alignment layer. In practical applications, as desired, the first alignment layers of the functional sub-layers may be independent from each other, or constitute a full-layer planar alignment layer; the second alignment layers of the functional sub-layers may be independent from each other, or constitute another full-layer planar alignment layer. In some implementations, the entire layer of the first alignment layers and/or the entire layer of the second alignment layers may be cut by a single mechanical cutting process.

Taking the light adjusting functional layer including two functional sub-layers (11a, 11b) as an example, the dye liquid crystal layers 117 of the two functional sub-layers (11a, 11b) are disposed at an interval. In some implementations, the dye liquid crystal layers 117 may be formed by performing a single mechanical cutting process. In this case, a position of cutting for forming the dye liquid crystal layers 117 is at a position of the sealants 117a between the two functional sub-layers (11a, 11b), so as to ensure the sealing performance of spaces surrounded by the sealants 117a and prevent the dye molecules 117c and the liquid crystal molecules 117b in the spaces surrounded by the sealants 117a from leaking.

In some implementations, a transparent insulating colloid (not shown in the figure) is disposed in the interval (i.e., the interval 13 shown in FIG. 8) between the first electrodes of the functional sub-layers or between the second electrodes of the functional sub-layers, so as to block external moisture or dust particles from entering the interval, thereby preventing the electrodes from being circuit-shorted.

Figure 10:
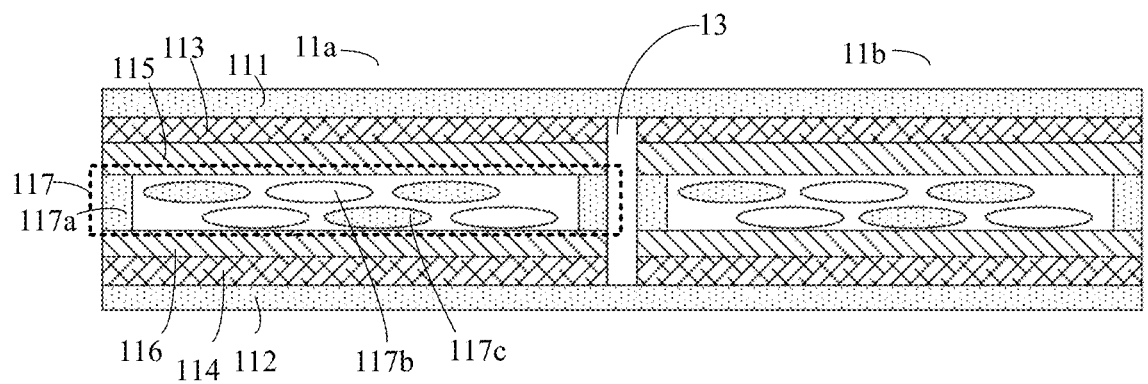
FIG. 10 is a cross-sectional view of a light adjusting functional layer according to an embodiment of the present disclosure.

In some implementations, a laser cutting process may be used to realize the partial cutting, and since the laser can penetrate through glass substrates to ablate and gasify inner film layers, as shown in FIG. 10, taking the example that the light adjusting functional layer includes the two functional sub-layers (11a, 11b), the first substrates 111 of the two functional sub-layers (11a, 11b) may constitute a full-layer planar substrate, and the second substrates 112 of the two functional sub-layers (11a, 11b) may constitute a full-layer planar substrate, that is, the two functional sub-layers (11a, 11b) share a full-layer planar substrate as the first substrates, and share another full-layer planar substrate as the second substrates. On this basis, one of the first electrodes 113 or the second electrodes 114 of the two functional sub-layers (11a, 11b) are formed into independent electrodes by adopting a laser cutting process, so that light adjusting region by region is realized. With such laser cutting process, it can be realized that each of the first substrates and the second substrates of the functional sub-layers are formed into a full-layer planar substrate, but corresponding film layers between the two full-layer planar substrates can be selectively cut, and structures of the film layers subjected to cutting may be the same as those obtained by the mechanical cutting process, and are not described in detail herein because the detailed description is provided in the foregoing.

Figure 11:
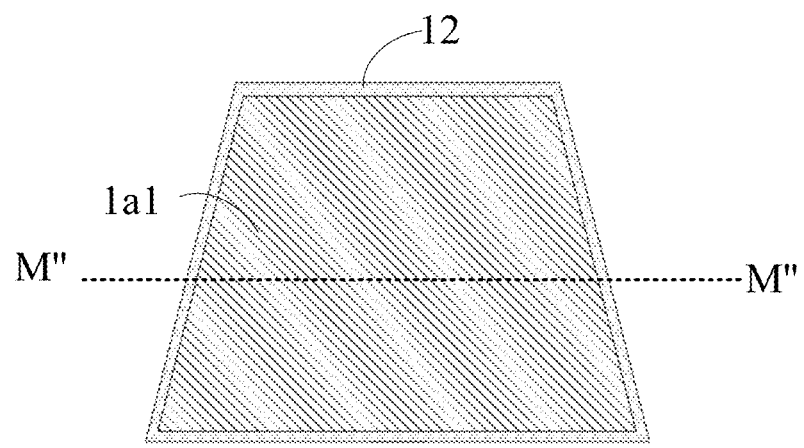
FIG. 11 is a plan view of a light adjusting functional layer according to an embodiment of the present disclosure.
Figure 12:
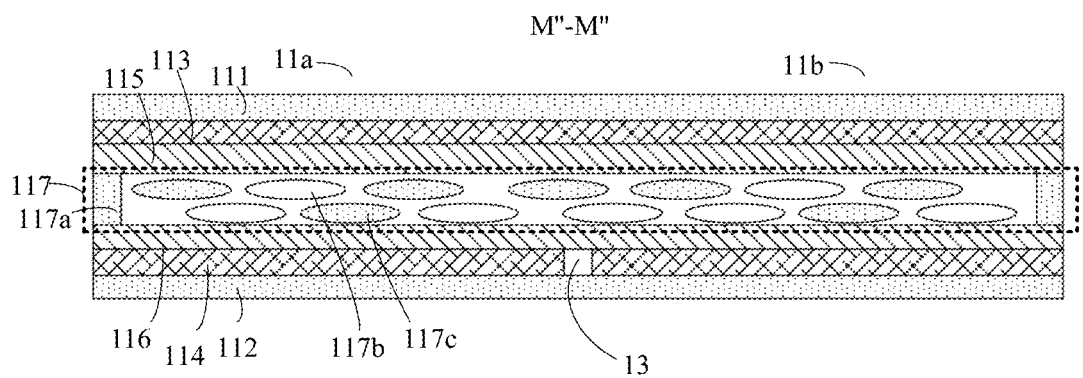
FIG. 12 is a cross-sectional view taken along line M"-M" of FIG. 11.
Figure 13:
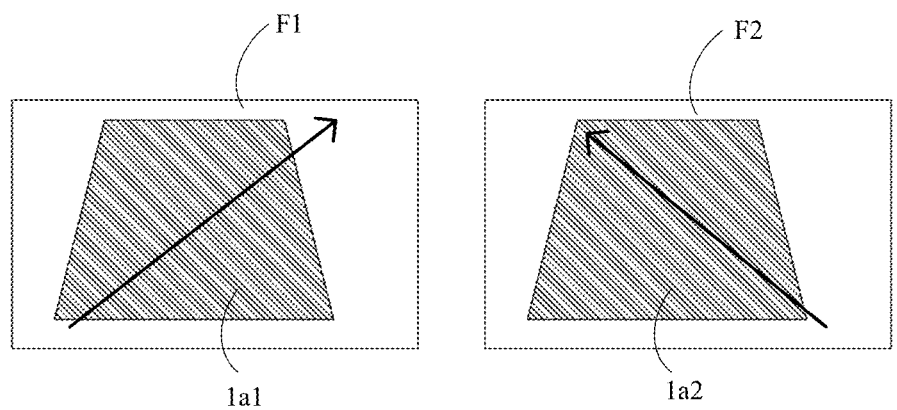
FIG. 13 is a diagram illustrating a comparison between alignment directions of two dye liquid crystal mother substrates according to an embodiment of the present disclosure.
Figure 14:
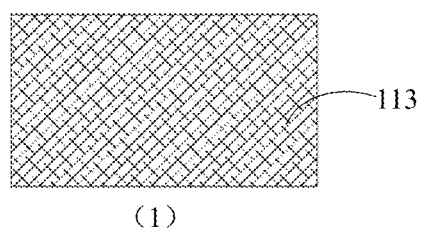
FIG. 14 is a plan view of a first electrode and a second electrode according to an embodiment of the present disclosure.
Figure 14:
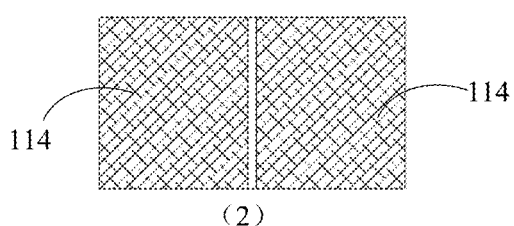

In some implementations, patterns of the first electrodes of the functional sub-layers and patterns of the second electrodes of the functional sub-layers may also be directly manufactured by using a sputtering deposition process or a laser etching process, so as to implement light adjusting region by region. Specifically, as shown in FIGS. 11 and 12, taking the light adjusting functional layer 1a1 including two functional sub-layers (11a, 11b) as an example, the first substrates 111 of the two functional sub-layers (11a, 11b) may constitute a full-layer planar substrate, and the second substrates 112 of the two functional sub-layers (11a, 11b) may constitute a full-layer planar substrate, that is, the two functional sub-layers (11a, 11b) share one full-layer planar substrate as the first substrates thereof, and share another full-layer planar substrate as the second substrates thereof. On this basis, the patterns of the first electrodes 113 of the two functional sub-layers (11a, 11b) and the patterns of the second electrodes 114 of the two functional sub-layers (11a, 11b) are made by adopting a sputtering deposition process or a laser etching process. For example, as shown in FIG. 13, during preparing the entire layer structures (F1, F2) of the two light adjusting functional layers (1a1, 1a2), which may be called dye liquid crystal mother substrates, a sputtering deposition process may be performed, region by region, on entire layers of the substrates (the first substrate and/or the second substrate) to directly deposit patterned electrodes (the first electrodes and/or the second electrodes) on the entire layers of the substrates, so that no subsequent cutting for entire layers of the electrodes is desired. In some implementations, an entire layer of electrodes (or called an entire electrode layer) may be deposited on the entire layers of the substrates, and then the entire layer of the electrodes is subjected to a laser etching process to form the patterned electrodes. For example, after the first electrodes 113 and the second electrodes 114 are patterned by using a sputtering deposition process or a laser etching process, as shown in (1) of FIG. 14, the pattern of the first electrodes 113 of the two functional sub-layers (11a, 11b) is a full-layer planar electrode layer; as shown in (2) of FIG. 14, the second electrodes 114 of the two functional sub-layers (11a, 11b) are patterned into two electrodes disposed at an interval in different regions. In some implementations, the interval between the two electrodes in the different regions is greater than or equal to 2 mm, and less than or equal to 4 mm, for example, greater than or equal to 1 mm, and less than or equal to 2 mm, so as to achieve isolation between the electrodes in the different regions.

That is, during preparing an entire layer structure of the light adjusting functional layer, electrode patterning is directly performed so as to realize light adjusting region by region. Then, cutting the two entire layer structures (F1, F2) respectively to make the two entire layer structures (F1, F2) each have an outer contour of a preset shape, such as an isosceles trapezoid as shown in FIG. 11. Then, the two light adjusting functional layers (1a1, 1a2) are to be fixed on a protective layer (such as a toughened glass) through a full-layer planar transparent adhesive layer, and the two light adjusting functional layers (1a1, 1a2) are stacked and fixed together through a full-layer planar transparent adhesive layer, compared with the two manufacturing modes of mechanical cutting and laser cutting, the subsequent partial cutting can be omitted, so that the processing procedure can be simplified on the basis of realizing light adjusting region by region, and the production efficiency is improved. Moreover, the situation, that the alignment directions of the four functional sub-layers are confused after the four functional sub-layers being stacked, in the related art is avoided, the consistency of the alignment directions in different regions is ensured, and therefore, no difference in transmittance and chromaticity exists during observing the four functional sub-layers at any viewing angle, and the uniformity of light adjusting can be improved. Furthermore, since the functional sub-layers are not to be spliced, the number of functional sub-layers to be spliced can be reduced, the manufacturing cost can be reduced, and the production efficiency can be improved.

An embodiment of the present disclosure provides another light adjusting structure, which can be included in the light adjusting module provided in the embodiment of the present disclosure. In particular, the light adjusting functional layer in the light adjusting structure includes a plurality of functional sub-layers distributed in different regions. Taking the light adjusting functional layer including two functional sub-layers (11a, 11b) as an example, as shown in FIG. 12, the first substrates 111 of the two functional sub-layers (11a, 11b) may constitute a full-layer planar substrate, and the second substrates 112 of the two functional sub-layers (11a, 11b) may constitute a full-layer planar substrate, that is, the two functional sub-layers (11a, 11b) share one full-layer planar substrate as the first substrates thereof, and share another full-layer planar substrate as the second substrates thereof. In addition, one of the first electrodes 113 or the second electrodes 114 of the two functional sub-layers (11a, 11b) are disposed at an interval, and the other one of the first electrodes 113 or the second electrodes 114 of the two functional sub-layers (11a, 11b) are disposed at an interval or constitute a full-layer planar electrode. For example, in FIG. 12, the first electrodes 113 of the two functional sub-layers (11a, 11b) are formed into a full-layer planar electrode, and the second electrodes 114 of the two functional sub-layers (11a, 11b) are disposed at an interval. Further, the interval (i.e., the interval 13) between the first electrodes 113 disposed at an interval and/or between the second electrodes 114 disposed at an interval is greater than or equal to 2 mm, and less than or equal to 4 mm, for example, greater than or equal to 1 mm and less than or equal to 2 mm, in order to achieve isolation between the electrodes.

In the related art, in each single functional sub-layer, a plurality of strip electrodes disposed at an interval can be formed through sputtering, the interval between every two adjacent electrodes is relatively small, and generally the problem of light leakage between the electrodes can be weakened in a case where the interval between the electrodes is within a range from 1 micrometer to 10 micrometers. In contrast, in the light adjusting structure provided by the embodiment of the present disclosure, on the basis that at least one of the first substrates 111 or the second substrates 112 of the two functional sub-layers (11a, 11b) constitute a full-layer planar substrate, one of the first electrodes 113 or the second electrodes 114 of the two functional sub-layers (11a, 11b) are disposed at an interval, and the sealants 117a of the two functional sub-layers (11a, 11b) are disposed at an interval, by disposing the sealants 117a of the two functional sub-layers (11a, 11b) at an interval, the interval between the electrodes and the interval between the sealants can be greater than those in the related art, and no problem of light leakage would occur, that is, the interval greater than or equal to 2 mm and less than or equal to 4 mm is much greater than the interval (1 μm to 10 μm) between adjacent electrodes in the related art. In other words, the "interval" adopted by the embodiment of the present disclosure is still equivalent to the interval, at the position of splicing, between the two independent functional sub-layers in the related art, but the interval in the embodiment of the present disclosure is less than the interval between the two independent functional sub-layers adjacent to each other in the related art.

In some implementations, the first alignment layers 115 of the two functional sub-layers (11a, 11b) constitute a full-layer planar alignment layer, and the second alignment layers 116 of the two functional sub-layers (11a, 11b) constitute a full-layer planar alignment layer; the dye liquid crystal layers 117 of the two functional sub-layers (11a, 11b) constitute a full-layer dye liquid crystal layer. That is, no cutting process is to be performed for forming the first alignment layer 115, the second alignment layer 116, and the dye liquid crystal layer 117 of the functional sub-layers, so that the processing procedure can be further simplified, light adjusting region by region can be realized, and the production efficiency can be improved.

On the basis of the above-mentioned light adjusting structures provided in the embodiments of the present disclosure, in some implementations, each of the first electrodes and the second electrodes of the functional sub-layers are provided with at least one bonding part, outside a transmittance adjusting region in which the electrodes are located, for bonding with a flexible circuit board. With the bonding part, the flexible circuit board can be electrically conducted with the electrodes more conveniently. The embodiment of the present disclosure does not particularly limit the number and positions of bonding parts, as long as the flexible circuit board can be electrically connected to the electrodes, and light adjusting region by region can be realized.

Figure 15:
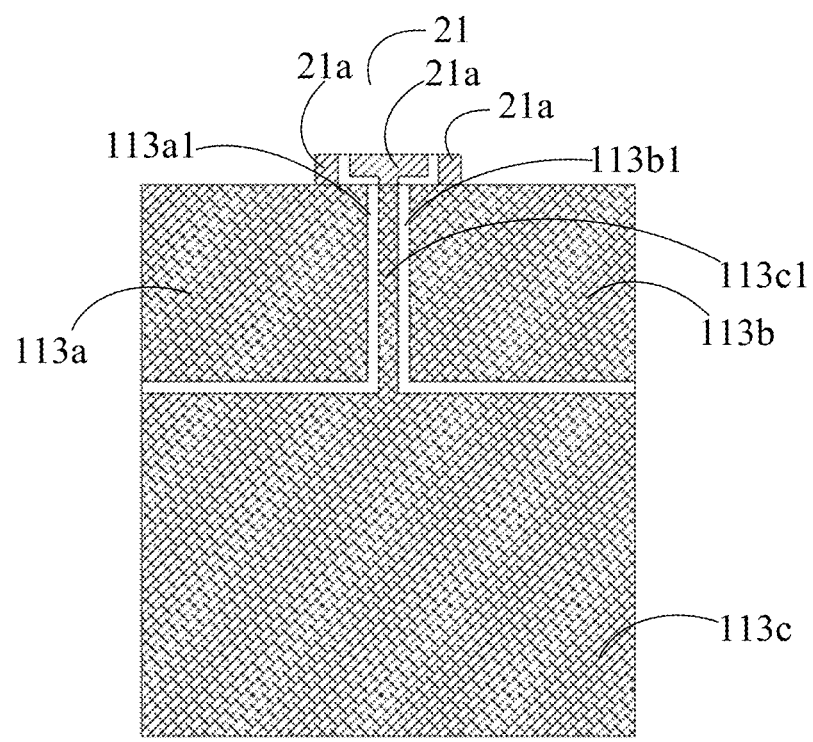
FIG. 15 is a plan view of three electrodes in regions and a bonding part according to an embodiment of the present disclosure.

In some implementations, the light adjusting functional layer includes three functional sub-layers, and at least one of the first electrodes or the second electrodes of the functional sub-layers are disposed at an interval, as shown in FIG. 15, taking the first electrodes 113 of the three functional sub-layers being disposed at an interval as an example, the first electrodes 113 are respectively a first electrode region 113a, a second electrode region 113b, and a third electrode region 113c. Such a division can be applied, for example, to roof panes of a passenger vehicle; the first electrode region 113a, the second electrode region 113b and the third electrode region 113c correspond to a main driver zone, a passenger seat zone and a back seat zone in an interior space of the passenger vehicle, respectively.

The first electrode region 113a and the second electrode region 113b are disposed on the same side of the third electrode region 113c; one bonding part 21 is disposed on a side of the first electrode region 113a and the second electrode region 113b away from the third electrode region 113c; the third electrode region 113c has an extension part 113c1, and an end of the extension part 113c1 passes through the interval between the first electrode region 113a and the second electrode region 113b, and extends to the side where the bonding part 21 is located; the bonding part 21 includes three bonding sub-parts 21a spaced apart from each other, the first electrode region 113a, the second electrode region 113b, and the extension part 113c1 each are bonded with a flexible circuit board (not shown in the drawing) through the three bonding sub-parts 21a, respectively. Taking an application to roof panes of a passenger vehicle as an example, the first electrode region 113a and the second electrode region 113b are located in an area of the roof panes of the passenger vehicle close to the main driver zone, the third electrode region 113c is located in an area of the roof panes of the passenger vehicle away from the main driver zone, the bonding part 21 is located at a side of the first electrode region 113a and the second electrode region 113b close to the main driver zone, and the extension part 113c1 of the third electrode region 113c extends to the position of the bonding part 21 from the side away from the main driver zone to the side close to the main driver zone by passing through the interval between the first electrode region 113a and the second electrode region 113b. In this way, the first electrode region 113a, the second electrode region 113b, and the third electrode region 113c may be independently controlled, respectively, so that light adjusting region by region can be realized. Moreover, an end of the extension part 113c1 passes through the interval between the first electrode region 113a and the second electrode region 113b and extends to the side where the bonding part 21 is located, so that the three electrode regions can be bonded at the same position through the bonding part 21, the bonding structure can be simplified, the bonding process can be simplified, and the cost can be reduced. It should be noted that the extension part 113c1 is spaced apart from the first electrode region 113a and the second electrode region 113b on two sides thereof by two intervals (113a1, 113b1), respectively, so as to avoid an electrical conduction between the electrode regions.

Figure 16:
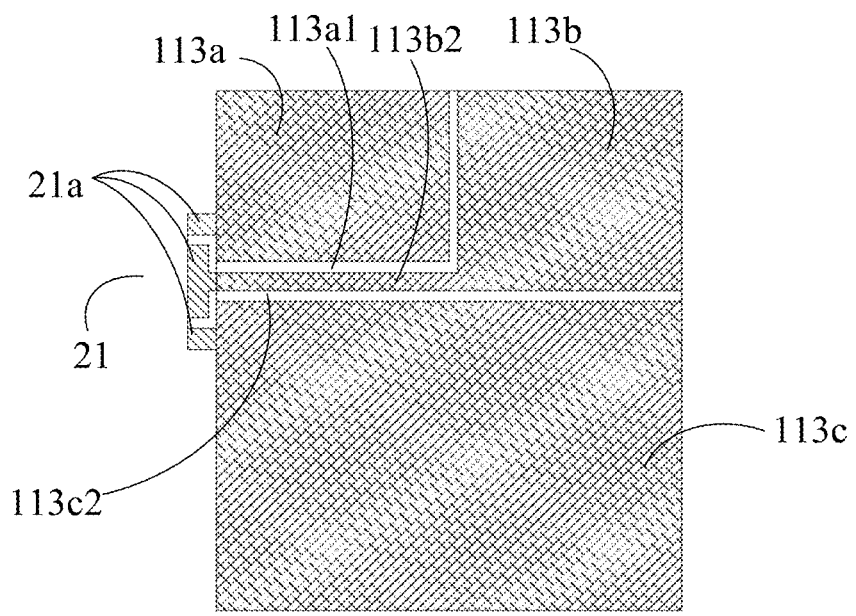
FIG. 16 is another plan view of three electrodes in regions and a bonding part according to an embodiment of the present disclosure.

In some implementations, the bonding part 21 may be disposed on the side of the first electrode region 113a and the third electrode region 113c away from the first electrode region 113a or the second electrode region 113b. Taking an application to roof panes of a passenger vehicle as an example, the bonding part 21 is located in an area of the roof panes of the passenger vehicle on the side where the main driver zone (as shown in FIG. 16) or the passenger seat zone is located. In this case, the first electrode region 113a or the second electrode region 113b has an extension part 113b2, and an end of the extension part 113b2 extends to the side, where the bonding part 21 is located, by passing through the interval between the second electrode region 113b and the third electrode region 113c or the interval between the first electrode region 113a and the third electrode region 113c. In this way, the first electrode region 113a, the second electrode region 113b, and the third electrode region 113c may be independently controlled.

Figure 17:
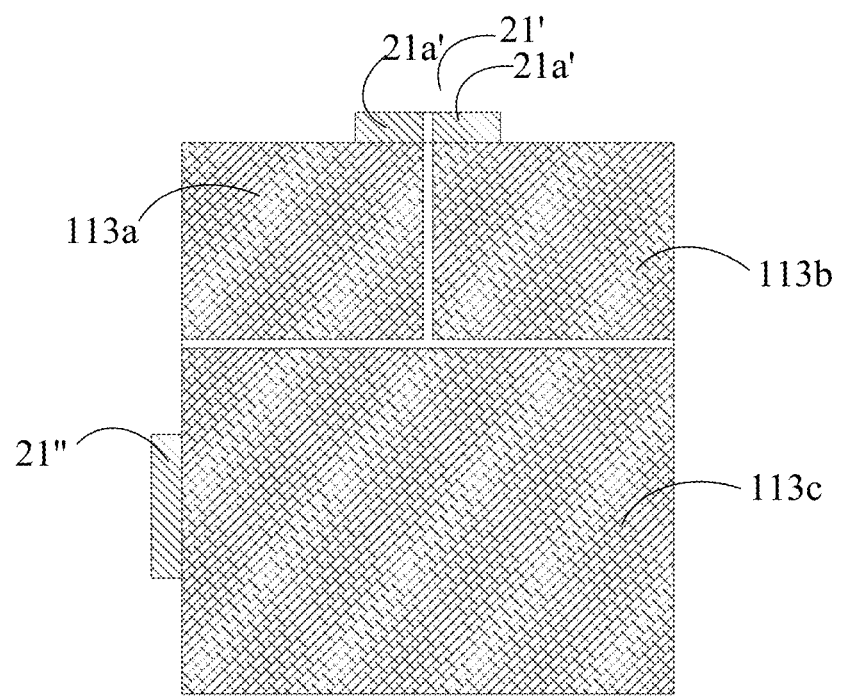
FIG. 17 is further another plan view of three electrodes in regions and a bonding part according to an embodiment of the present disclosure.

In the foregoing description, one bonding part 21 is adopted for bonding three electrode regions with the flexible circuit board, but the embodiment of the present disclosure is not limited thereto, and in practical applications, multiple bonding parts may be adopted, and taking the first electrode region 113a, the second electrode region 113b and the third electrode region 113c as an example, as shown in FIG. 17, two bonding parts are adopted, one bonding part is a first bonding part 21' disposed on a side of the first electrode region 113a and the second electrode region 113b away from the third electrode region 113c, and the other bonding part is a second bonding part 21" disposed on a side of the third electrode region 113c away from the first electrode region 113a or the second electrode region 113b. Taking an application to roof panes of a passenger vehicle as an example, the first bonding part 21' is disposed on the side, close to the main driver zone, of the first electrode region 113a and the second electrode region 113b; the second bonding part 21" is located in an area of the roof panes of the passenger vehicle where the main driver zone or the passenger seat zone is located. The first bonding part 21' includes two bonding sub-parts 21a' spaced apart from each other, and the first electrode region 113a and the second electrode region 113b are bonded to a flexible circuit board through the two bonding sub-parts 21a', respectively; the third electrode region 113c is bonded with another flexible circuit board through the second bonding part 21". In this way, the first electrode region 113a, the second electrode region 113b, and the third electrode region 113c may be independently controlled.

In some implementations, taking the first electrodes of the three functional sub-layers being the first electrode region 113a, the second electrode region 113b, and the third electrode region 113c as an example, patterns of the first electrode region 113a, the second electrode region 113b, and the third electrode region 113c may be formed by performing a laser etching process on an entire layer of electrodes (also called an entire electrode layer), and intervals between different electrode regions are etching lines formed by performing laser etching on the entire layer of electrodes. Certainly, the method for manufacturing the electrode regions is not particularly limited in the embodiment of the present disclosure, and for example, a method of sputtering region by region may be adopted to deposit the electrode regions.

In some implementations, taking the bonding part 21 shown in FIG. 15 as an example, a shape of an outer contour of the bonding part 21 is a rectangle, and a length of the rectangle is greater than or equal to 30 mm and less than or equal to 60 mm, and a width of the rectangle is greater than or equal to 6 mm and less than or equal to 15 mm.

In some implementations, taking the bonding part 21 shown in FIG. 15 as an example, intervals between the extension part 113c1 and the electrode regions, i.e., two intervals (113a1, 113b1) between the extension part 113c1 and the first electrode region 113a on a side of the extension part 113c1 and between the extension part 113c1 and the second electrode region 113b on a side of the extension part 113c1 each are greater than or equal to 40 μm, and less than or equal to 80 μm. This numerical range is set based on a minimum line width recognizable to human eyes, so that the intervals would not be observed by the human eyes, and the effect of hiding the intervals can be achieved.

In some implementations, taking the bonding part 21 shown in FIG. 15 as an example, the interval between every two adjacent bonding sub-parts 21a is greater than or equal to 0.1 mm, and less than or equal to 1 mm. In some implementations, the bonding sub-parts 21a may be fabricated by applying a laser etching process to an entire layer of the bonding part 21, in this case, the interval between every two adjacent bonding sub-parts 21a is an etching line formed by performing laser etching on the entire layer of the bonding part 21.

In some implementations, the light adjusting structure provided by the embodiment of the present disclosure can be applied to roof panes of a passenger vehicle; the first electrode region 113a, the second electrode region 113b and the third electrode region 113c correspond to the main driver zone, the passenger seat zone and the back seat zone in the interior space of the passenger vehicle, respectively. However, the embodiment of the present disclosure is not limited thereto, and in practical applications, the corresponding number of regions and a layout mode of the regions may be freely set according to different application scenarios. Furthermore, the number of bonding parts, positions of the bonding parts and the manner of bonding the bonding parts with the corresponding electrode regions are not particularly limited in the embodiment of the present disclosure, as long as light adjusting region by region can be achieved.

Figure 19:
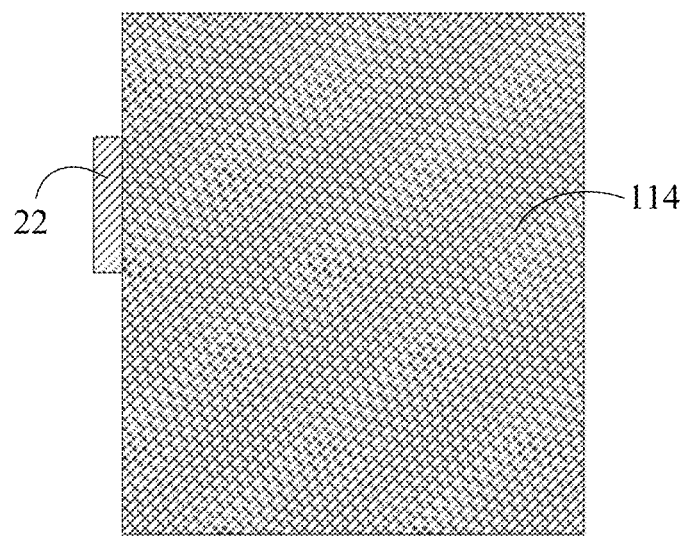
FIG. 19 is another plan view of a full-layer planar electrode layer and a bonding part according to an embodiment of the present disclosure.
Figure 20:
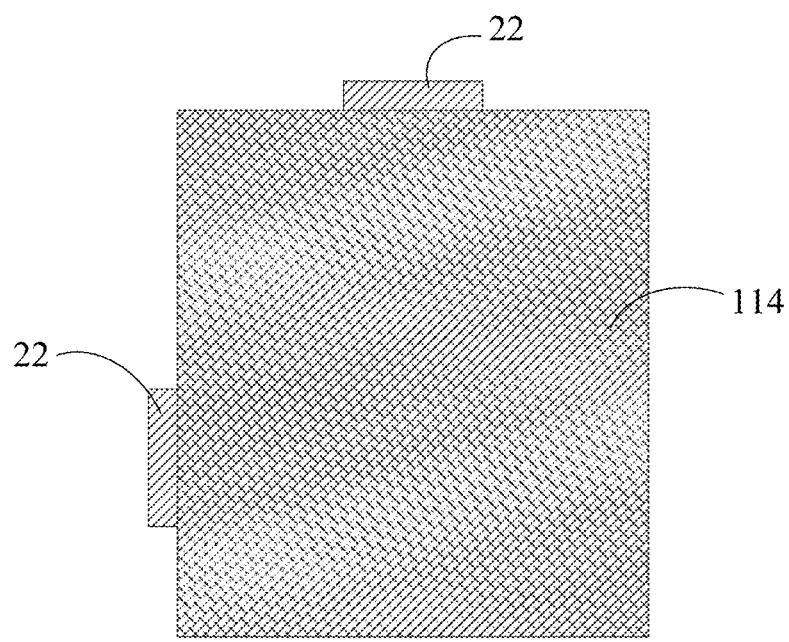
FIG. 20 is further another plan view of a full-layer planar electrode layer and a bonding part according to an embodiment of the present disclosure.

In some implementations, a first electrode bonding part is provided for the first electrodes 113 of the functional sub-layers; a second electrode bonding part is provided for the second electrodes 114 of the functional sub-layers. The second electrode bonding part is disposed opposite to the first electrode bonding part. For example, taking the bonding part 21 shown in FIG. 15 being the first bonding part as an example, the second electrode 114 shown in FIG. 18 is provided with the second electrode bonding part 22 at a position opposite to the bonding part 21 shown in FIG. 15; taking the bonding part 21 shown in FIG. 16 being the first bonding part as an example, the second electrode 114 shown in FIG. 19 is provided with the second electrode bonding part 22 at a position opposite to the bonding part 21 shown in FIG. 16; taking both the two bonding parts 21' and 21" shown in FIG. 17 being the first bonding parts, the two second electrode bonding parts 22 provided for the second electrode 114 shown in FIG. 20 are located at positions opposite to the two bonding parts 21' and 21" shown in FIG. 17, respectively.

Figure 21:
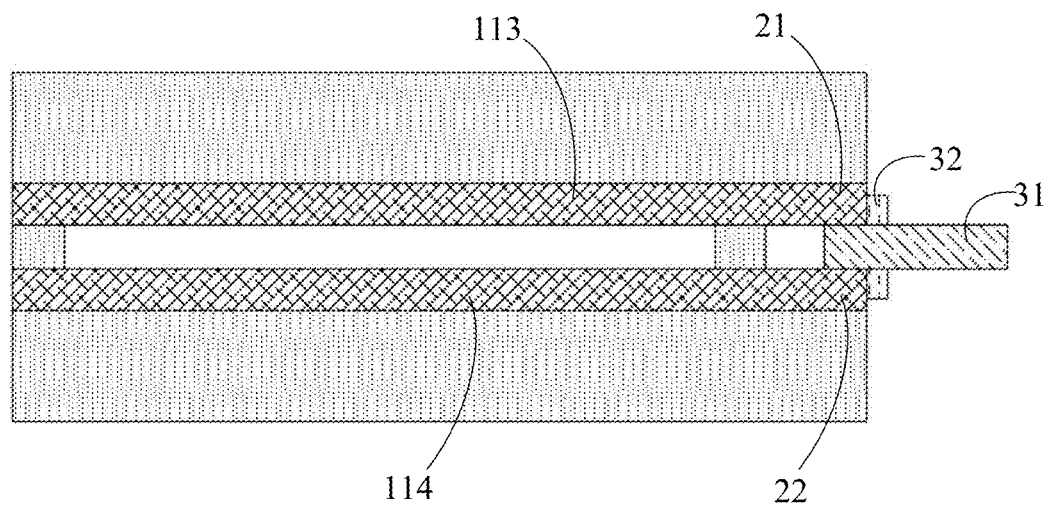
FIG. 21 is a schematic diagram of bonding between a contact part of a flexible circuit board and bonding parts of two electrodes according to an embodiment of the present disclosure.
Figure 22:
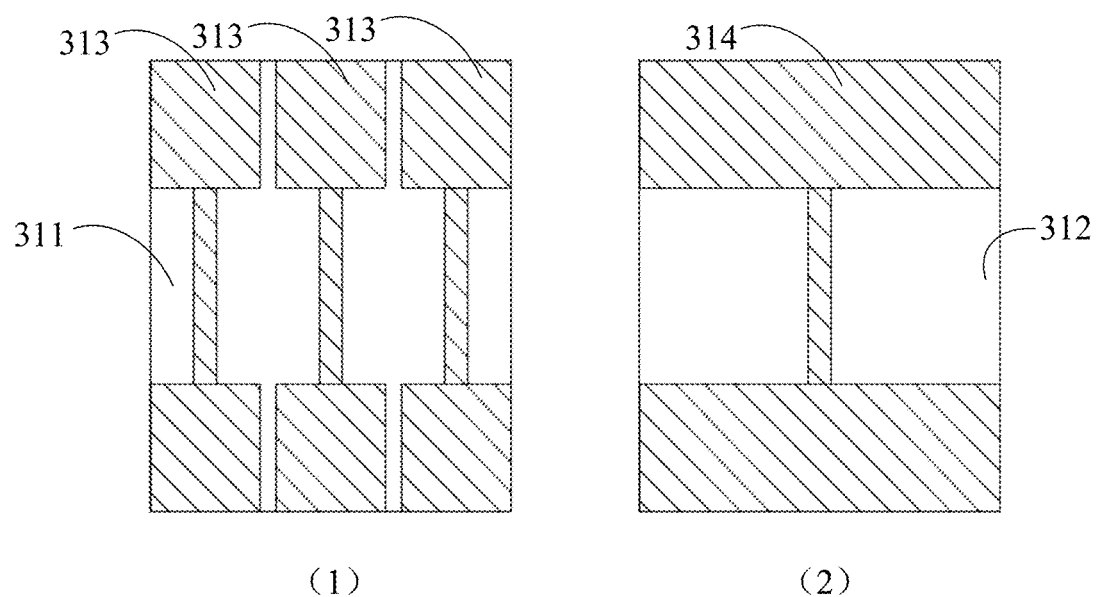
FIG. 22 illustrate plan views of a first contact surface and a second contact surface of a contact part according to an embodiment of the present disclosure.

On the basis of above, as shown in FIG. 21, the flexible circuit board has a contact part 31 provided between the first electrode bonding part (for example, the bonding part 21 shown in FIG. 15) and the second electrode bonding part 22, and as shown in (1) and (2) of FIG. 22, the contact part 31 includes a first contact surface 311 and a second contact surface 312 facing away from each other, the first contact surface 311 faces the first electrode bonding part (for example, the bonding part 21 shown in FIG. 15), and the second contact surface 312 faces the second electrode bonding part 22. The first contact surface 311 is provided thereon with at least one first bonding terminal 313 electrically contacting with the first electrode bonding part (e.g., the bonding part 21 shown in FIG. 15), and the first electrode 113 of at least one functional sub-layer is electrically conducted to the flexible circuit board through the at least one first bonding terminal 313; the second contact surface 312 is provided thereon with at least one second bonding terminal 314 electrically contacting the second electrode bonding part 22, and the second electrode 114 of at least one functional sub-layer is electrically conducted with the flexible circuit board through the at least one second bonding terminal 314. In some implementations, a conductive adhesive, such as anisotropic conductive film (ACF), may be coated on surfaces of the first electrode bonding part (e.g., the bonding part 21 shown in FIG. 15) and the second electrode bonding part 22 for electrically contacting with the contact part 31, and then the first contact surface 311 and the second contact surface 312 of the contact part 31 are respectively press-attached to the surfaces of the first electrode bonding part (e.g., the bonding part 21 shown in FIG. 15) and the second electrode bonding part 22 for electrically contacting with the contact part 31. In some implementations, as shown in FIG. 21, a protective colloid 32 is disposed at an interface between the contact part 31 and the first electrode bonding part (for example, the bonding part 21 shown in FIG. 15), the second electrode bonding part 22, for sealing the interface. The protective colloid 32 is, for example, an ultraviolet (UV) protective colloid.

Figure 18:
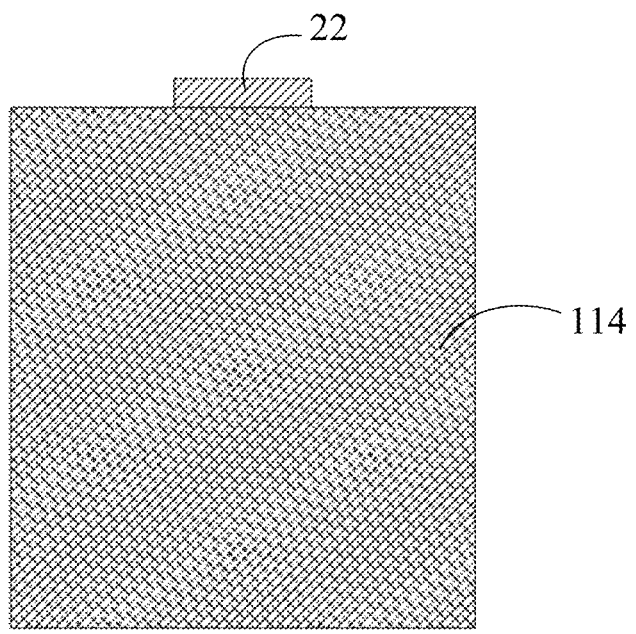
FIG. 18 is a plan view of a full-layer planar electrode layer and a bonding part according to an embodiment of the present disclosure.

Taking a case where three functional sub-layers are adopted, the first electrodes of the three functional sub-layers are the first electrode region 113a, the second electrode region 113b and the third electrode region 113c, respectively, and the second electrodes 114 of the three functional sub-layers constitute a full-layer planar electrode layer as an example, the first electrode bonding part (for example, the bonding part 21 shown in FIG. 15) includes three bonding sub-parts 21a spaced apart from each other, the first electrode region 113a and the second electrode region 113b, and the extension part 113c1 are connected to the three bonding sub-parts 21a, respectively; as shown in FIG. 18, the second electrode bonding part 22 is connected to the entire planar electrode layer (i.e., the second electrode 114). As shown in FIG. 22, the contact part 31 of the flexible circuit board has the first contact surface 311 facing the first electrode bonding part (for example, the bonding part 21 shown in FIG. 15), and the second contact surface 312 facing the second electrode bonding part 22. The first contact surface 311 is provided thereon with three first bonding terminals 313 electrically contacting with the three bonding sub-parts 21a, respectively, and the first electrode region 113a, the second electrode region 113b and the third electrode region 113c are electrically connected to the flexible circuit board through the three first bonding terminals 313, respectively; the second contact surface 312 is provided thereon with the second bonding terminal 314 electrically contacting with the second electrode bonding part 22, and the full-layer planar electrode is electrically connected to the flexible circuit board through the second bonding terminal 314. In some implementations, the first bonding terminals 313 and the second bonding terminal 314 are all made of copper foil. It is easily understood that, for the three first bonding terminals 313, a width of the first bonding terminal 313 located in the middle should be less than the interval between two etching lines on the first electrode bonding part (e.g., the bonding part 21 shown in FIG. 15), i.e., is the length of the bonding sub-part 21a in the middle as shown in FIG. 15, to ensure that the first bonding terminal 313 in the middle does not contact with the bonding sub-parts 21a on both sides thereof.

The light adjusting structure provided by the embodiment of the present disclosure adopts the full-layer planar substrate as the shared/common substrate of the functional sub-layers, so that the light adjusting functional layer consisting of the functional sub-layers is of an integrated structure, that is, the functional sub-layers are not independent, compared with the spliced structure of four independent functional sub-layers in the related art, during manufacturing the light adjusting module, the light adjusting functional layer is fixed on the protective layer through the full-layer planar transparent adhesive layer, and in the case where two light adjusting functional layers are included in the light adjusting module, the two light adjusting functional layers are stacked and fixed together through the full-layer planar transparent adhesive layer without splicing the functional sub-layers, so that the case where the alignment directions of the four functional sub-layers are confused after the four functional sub-layers being stacked in the related art does not exist, the alignment directions in different regions are ensured to be consistent, and no differences in transmittance and chromaticity occurs at any viewing angle, and then the uniformity of light adjusting can be improved. Moreover, since the functional sub-layers are not to be spliced, the number of functional sub-layers to be spiced can be reduced, the manufacturing cost can be reduced, and the production efficiency can be improved. On the basis of achieving the above-described effects, in order to realize light adjusting region by region, one of the first electrodes or the second electrodes of the functional sub-layers are disposed at an interval, and the other one of the first electrodes or the second electrodes of the functional sub-layers are disposed at an interval or constitute a full-layer planar electrode, so that different voltages can be applied to the electrodes in different regions independently, thereby realizing light adjusting region by region.

As another technical solution, an embodiment of the present disclosure further provides a light adjusting module, which includes the light adjusting structure provided in the embodiment of the present disclosure. The light adjusting module further includes a first protective layer and a second protective layer (for example, the protective layer 14 shown in FIG. 6) which are oppositely disposed, and the first protective layer and the second protective layer are both made of toughened glass, for example. The light adjusting structure is disposed between the first protective layer and the second protective layer.

In some implementations, the light adjusting structure is fixed to the first protective layer and the second protective layer through two first transparent adhesive layers (e.g., the first transparent adhesive layers 15 shown in FIG. 6). The light adjusting module can be applied to the field of vehicles such as passenger vehicles, rail vehicles, airplanes and ships. In some implementations, the light adjusting structure is fixed to the first protective layer through the first transparent adhesive layer, the light adjusting structure and the second protective layer are disposed at an interval, that is, a hollow space is formed between the light adjusting structure and the second protective layer, and the light adjusting module can be applied to the field of buildings such as a lighting roof, a curtain wall and the like. The first transparent adhesive layer (for example, the first transparent adhesive layer 15 shown in FIG. 6) is a full-layer planar adhesive layer. In some implementations, the two light adjusting functional layers (1a1, 1a2) are fixed by a second transparent adhesive layer (for example, the second transparent adhesive layer 16 shown in FIG. 6); the second transparent adhesive layers 16 is a full-layer planar adhesive layer.

During manufacturing the light adjusting module, the light adjusting functional layer is to be fixed on the protective layer 14 through first transparent adhesive layer 15, and in the case where two light adjusting functional layers (1a1,1a2) are included in the light adjusting module, only the two light adjusting functional layers (1a1,1a2) are to be fixed together through the second transparent adhesive layer 16 without splicing the functional sub-layers in each light adjusting functional layer, thereby the case where alignment directions of four functional sub-layers are confused after the four functional sub-layers are stacked in the related art would not occur, which guarantees that the alignment directions in different regions are consistent, thereby no differences in transmittance and chromaticity would occur at any viewing angle, and then the uniformity of light adjusting can be improved. Moreover, since the functional sub-layers are not to be spliced, the number of functional sub-layers to be spliced can be reduced, the manufacturing cost can be reduced, and the production efficiency can be improved.

In some implementations, in order to meet different application scenarios, multiple light adjusting structures are adopted and are spliced with each other. In particular, two light adjusting structures (1a, 1b) as shown in FIG. 5 may be employed. Since the two light adjusting structures have been described in detail in the foregoing, they will not be described in detail herein. Certainly, the embodiment of the present disclosure is not limited to the description in the foregoing, and in practical applications, the number of the light adjusting structures, the shape of the outer contour of the light adjusting structure, and the manner of splicing the light adjusting structures may be freely set according to different application scenarios, or one light adjusting structure may also be used.

In some implementations, in order to achieve light adjusting region by region, the first electrodes of the functional sub-layers are disposed at an interval, and the second electrodes of the functional sub-layers are disposed at an interval, in this case, the light adjusting module further includes a plurality of first flexible circuit boards correspondingly bonded to the first electrodes of the functional sub-layers, and a plurality of second flexible circuit boards correspondingly bonded to the second electrodes of the functional sub-layers. Alternatively, the first electrodes of the functional sub-layers are disposed at an interval, and the second electrodes of the functional sub-layers form a full-layer planar electrode, in this case, the light adjusting module further includes a plurality of first flexible circuit boards correspondingly bonded to the first electrodes of the functional sub-layers, and one second flexible circuit board bonded to the full-layer planar electrode. Both such two cases can realize independent control on the functional sub-layers corresponding to different regions. The manner in which the first flexible circuit board is bonded to the first electrode, and the manner in which the second flexible circuit board is bonded to the second electrode each can be realized in the same manner in which the aforementioned bonding part and the contact part are bonded, and since the detailed description is already given in the foregoing, the detailed description is not repeated here.

Figure 23:
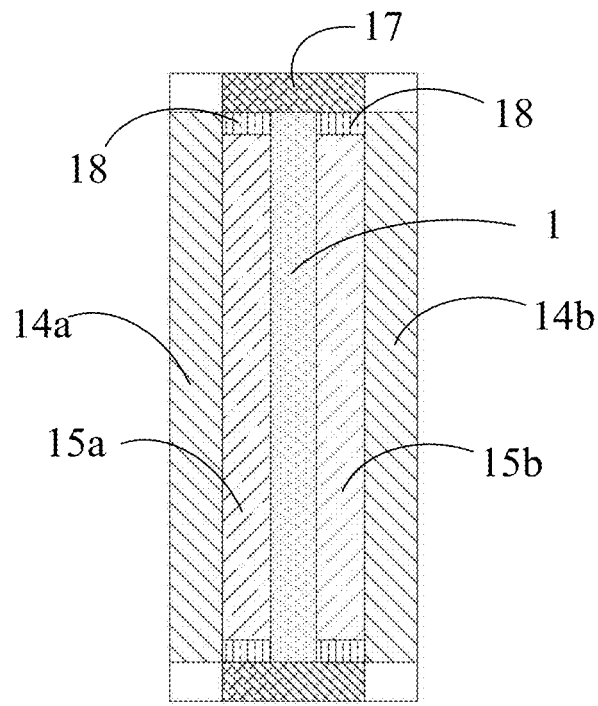
FIG. 23 is a cross-sectional view of a light adjusting module with one light adjusting functional layer according to an embodiment of the present disclosure.

In some implementations, in the case where one light adjusting functional layer is included in the light adjusting module, as shown in FIG. 23, the light adjusting module further includes a first protective layer 14a and a second protective layer 14b, which are oppositely disposed, and are made of, for example, toughened glass, and the light adjusting structure is disposed between the first protective layer 14a and the second protective layer 14b and is fixed to the first protective layer 14a and the second protective layer 14b through two first transparent adhesive layers (15a,15b) respectively; the light adjusting module further includes a sealant 17 disposed between the first protective layer 14a and the second protective layer 14b and surrounding the light adjusting structure 1, and a buffer adhesive tape 18 is disposed around between the sealant 17 and the two first transparent adhesive layers (15a,15b). The buffer adhesive tape 18 is, for example, very high bond (VHB) adhesive tape. In some implementations, a thickness of the sealant 17 satisfies the following relation: T3=T2+2×T1, T3 is the thickness of the sealant 17, T2 is a thickness of the light adjusting structure 1, T1 is a thickness of the buffer adhesive tape 18, and the thickness of the buffer adhesive tape 18 is equal to a thickness of the first transparent adhesive layer.

In some implementations, the thickness of the light adjusting structure 1 is greater than or equal to 0.1 mm and less than or equal to 0.4 mm; the thickness of the buffer adhesive tape is 0.4 mm, or 0.5 mm, or 0.6 mm, or 0.8 mm, or 1.1 mm. The transmittance of the light adjusting module is in a range from 2% to 20%.

Figure 24:
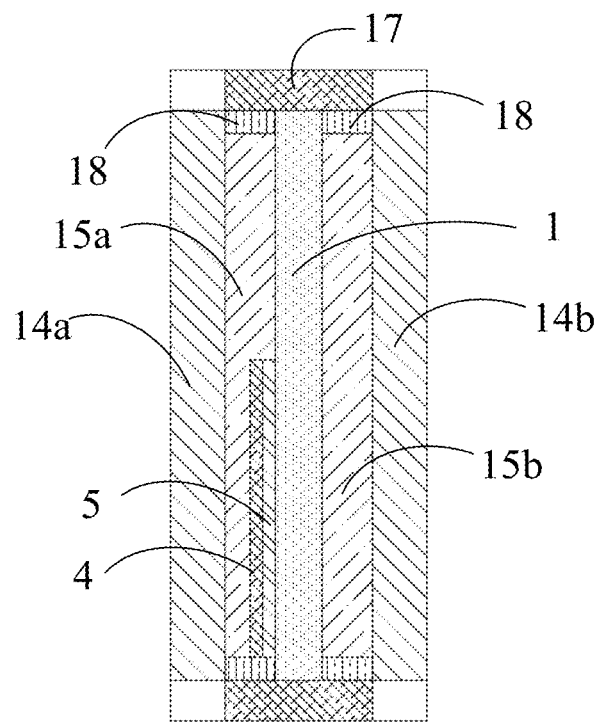
FIG. 24 is a cross-sectional view of a light adjusting module integrated with a transparent display panel according to an embodiment of the present disclosure.

In some implementations, in order to integrate a display function in the light adjusting module, for example, in a case where the light adjusting module is applied to roof panes of a passenger vehicle, the entertainment function of the roof panes can be enriched, as shown in FIG. 24, the light adjusting module further includes a transparent display panel 4, and the transparent display panel 4 is, for example, an organic light emitting diode (OLED) display panel. The transparent display panel 4 is disposed between the light adjusting structure 1 and one of the first transparent adhesive layers 15a, and is located in the region where one of the functional sub-layers of the light adjusting functional layer of the light adjusting structure 1 is located, and the first transparent adhesive layer 15a is disposed to eliminate a step/height difference between the transparent display panel and the light adjusting structure 1; the transparent display panel 4 is fixed to the light adjusting structure 1 through the second transparent adhesive layer 5. The transparent display panel 4 is located in the region where one of the functional sub-layers of the light adjusting functional layer of the light adjusting structure 1 is located, so that a local display function can be realized, for example, the transparent display panel 4 can be disposed in the region of the roof panes of the passenger vehicle corresponding to the back seat. The first transparent adhesive layer and the second transparent adhesive layer 5 are, for example, liquid optical clear adhesives (OCR)

In some implementations, a sealant of the transparent display panel 4 adopts a transparent colloid. Therefore, obvious stripes caused by a difference in color can be avoided in the entire region, in which the transmittance is adjusted, of the light adjusting module.

In some implementations, the transparent display panel 4 is a flexible transparent display panel.

As another technical solution, an embodiment of the present disclosure further provides a light adjusting device, which is any one of a lighting roof, a curtain wall, a passenger vehicle, a rail vehicle, an airplane, and a ship; the light adjusting device includes the light adjusting module provided by the embodiment of the present disclosure.

In some implementations, the light adjusting structure provided by the embodiment of the present disclosure can be applied to roof panes of a passenger vehicle; the first electrode region 113a, the second electrode region 113b and the third electrode region 113c correspond to a main driver zone, a passenger seat zone and a back seat zone in an interior space of the passenger vehicle, respectively. However, the embodiment of the present disclosure is not limited thereto, and in practical applications, the corresponding number of regions and a layout mode of the regions may be freely set according to different application scenarios. Furthermore, the number of bonding parts and positions of the bonding parts, and the manner in which the bonding parts are bonded with the corresponding electrode regions are not particularly limited in the embodiment of the present disclosure, as long as light adjusting region by region can be achieved.

In some implementations, the light adjusting module further includes the transparent display panel 4 mentioned above, and the glass of the passenger vehicle includes roof panes; the transparent display panel 4 is located in the region in which the functional sub-layer corresponding to the back seat zone is located.

As another technical solution, an embodiment of the present disclosure further provides a method for manufacturing a light adjusting structure, taking the light adjusting structure shown in FIGS. 5 to 9 as an example, the method includes: providing an entire layer structure of one or two light adjusting functional layers; cutting the entire layer structure to enable the entire layer structure to have an outer contour of a preset shape; partially cutting the entire layer structure subjected to the previous cutting to obtain a plurality of functional sub-layers distributed in different regions.

As shown in FIG. 9, entire layer structures (F1, F2) of two light adjusting functional layers (1a1, 1a2) can be called dye liquid crystal mother substrates.

For example, the preset shape is an isosceles trapezoid. During cutting, the entire layer structure may be cut along the outer contour of the preset shape, and for example, a mechanical cutting may be used. After the cutting, the light adjusting functional layer shown in FIG. 7 can be obtained, and the sealant 12 is disposed around the outer contour of the light adjusting functional layer.

Referring to FIG. 8, taking the light adjusting functional layer including two functional sub-layers (11a, 11b) as an example, each functional sub-layer includes: a first substrate 111 and a second substrate 112 disposed opposite to each other, a first electrode 113 and a second electrode 114 respectively disposed on sides of the first substrate 111 and the second substrate 112 facing each other; a first alignment layer 115 and a second alignment layer 116 respectively provided on sides of the first electrode 113 and the second electrode 114 facing each other; and a dye liquid crystal layer 117 between the first alignment layer 115 and the second alignment layer 116; at least one of the first substrates 111 or the second substrate 112 of the two functional sub-layers (11a, 11b) constitute a full-layer planar substrate, for example, the second substrates 112 in FIG. 8 constitute a full-layer planar substrate; one of the first electrodes 113 or the second electrodes 114 of the two functional sub-layers (11a, 11b) are disposed at an interval, and the other one of the first electrodes 113 or the second electrodes 114 of the two functional sub-layers (11a, 11b) are disposed at an interval or constitute a full-layer planar electrode. For example, in FIG. 8, the first electrodes 113 of the two functional sub-layers (11a, 11b) are disposed at an interval, the second electrodes 114 of the two functional sub-layers (11a, 11b) constitute a full-layer planar electrode, and the dye liquid crystal layers 117 of the two functional sub-layers (11a, 11b) each include a sealant 117a disposed around between the first alignment layer 115 and the second alignment layer 116, and liquid crystal molecules 117b and dye molecules 117c disposed in a space surrounded by the sealant 117a; the sealants 117a of the two functional sub-layers (11a, 11b) are disposed at an interval, and the spaces surrounded by the sealants 117a of the two functional sub-layers (11a, 11b) are isolated from each other.

By adopting the full-layer planar substrate as the shared/common substrate of the functional sub-layers, the light adjusting functional layer composed of the functional sub-layers can be in an integrated structure, that is, the functional sub-layers are not independent, compared with the structure in which four independent functional sub-layers are spliced in the related art, during manufacturing the light adjusting module, as shown in FIG. 6, the light adjusting functional layer is fixed on the protective layer 14 through the full-layer planar transparent adhesive layer 15, and in the case where the light adjusting module includes two light adjusting functional layers, the two light adjusting functional layers (1a1, 1a2) are stacked and fixed together through the full-layer planar transparent adhesive layer 16, and the functional sub-layers in each light adjusting functional layer are not to be spliced. Then, the two light adjusting functional layers (1a1, 1a2) are to be fixed on the protective layer 14 through the full-layer planar transparent adhesive layer 15, and the two light adjusting functional layers (1a1, 1a2) are stacked and fixed together through the full-layer planar transparent adhesive layer 16, and the two functional sub-layers (11a, 11b) in each light adjusting functional layer are not to be spliced, so that the case where the alignment directions of the four functional sub-layers are confused after the four functional sub-layers being stacked in the related art would not occur, the alignment directions in different regions are consistent, and therefore, no differences in transmittance and chromaticity would occur at any viewing angle, and further, the uniformity of light adjusting can be improved. Moreover, since the functional sub-layers are not to be spliced, the number of functional sub-layers to be spliced can be reduced, the manufacturing cost can be reduced, and the production efficiency can be improved. On the basis of achieving the above-described effects, in order to realize light adjusting region by region, one of the first electrodes or the second electrodes of the functional sub-layers are disposed at an interval, and the other one of the first electrodes or the second electrodes of the functional sub-layers are disposed at an interval or constitute a full-layer planar electrode, so that different voltages can be applied to the electrodes in different regions independently, thereby realizing light adjusting region by region.

In some implementations, the partially cutting the entire layer structure subjected to the previous cutting includes: cutting the entire layer substrate subjected to the previous cutting by using a single mechanical cutting process, to cut the entire layer of the first substrates, the entire layer of the first electrodes, and the entire layer of the first alignment layers of the functional sub-layers, and the sealant in the same layer as and between the dye liquid crystal layers of the functional sub-layers adjacent to each other, so that the first substrates of the functional sub-layers are disposed at an interval, the first electrodes of the functional sub-layers are disposed at an interval, the first alignment layers of the functional sub-layers are disposed at an interval, and the sealants of the functional sub-layers are disposed at an interval; the second substrates of the functional sub-layers constitute a full-layer planar substrate; the second electrodes of the functional sub-layers constitute a full-layer planar electrode; the second alignment layers of the functional sub-layers constitute a full-layer planar alignment layer.

By adopting a single mechanical cutting process, the cutting of a plurality of film layers can be completed simultaneously, so that the mode of cutting is relatively simple, and the processing cost is relatively low.

In some implementations, the partially cutting the entire layer structure subjected to the previous cutting includes: cutting the entire layer structure subjected to the previous cutting by using a single mechanical cutting process, to cut the entire layer of the first substrates, the entire layer of the first electrodes, and the entire layer of the first alignment layers, and the entire layer of the dye liquid crystal layers of the functional sub-layers, so that the first substrates of the functional sub-layers are disposed at an interval, the first electrodes of the functional sub-layers are disposed at an interval, the first alignment layers of the functional sub-layers are disposed at an interval, and the dye liquid crystal layers of the functional sub-layers are disposed at an interval; the second alignment layers of the functional sub-layers constitute a full-layer planar alignment layer; the second electrodes of the functional sub-layers constitute a full-layer planar electrode; the second substrates of the functional sub-layers constitute a full-layer planar substrate.

The first substrates, the first electrodes, the first alignment layers and the dye liquid crystal layers of the functional sub-layers can be obtained simultaneously by cutting by adopting a single mechanical cutting process. In addition, the entire planar layer not to be cut is kept to be entire. In this way, partial cutting is achieved.

In some implementations, taking the light adjusting structure shown in FIG. 10 as an example, the partially cutting the entire layer structure subjected to the previous cutting includes: cutting the entire layer, subjected to the previous cutting, of one of the first electrodes or the second electrodes of the functional sub-layers by adopting a laser cutting process, so as to enable one of the first electrodes or the second electrodes of the plurality of functional sub-layers to be disposed at an interval; the first substrates of the functional sub-layers constitute a full-layer planar substrate, and the second substrates of the functional sub-layers constitute a full-layer planar substrate.

With the laser cutting process, it can realize that the first substrates of the functional sub-layers are a full-layer planar substrate, and the second substrates of the functional sub-layers are a full-layer planar substrate, and corresponding film layers between such two full-layer planar substrates can be selectively cut.

As another technical solution, an embodiment of the present disclosure further provides a method for manufacturing a light adjusting structure, taking the light adjusting structure shown in FIGS. 11 and 12 as an example, the method includes: manufacturing one or two light adjusting functional layers stacked, so that each light adjusting functional layer includes a plurality of functional sub-layers distributed in different regions, and each functional sub-layer includes a first substrate and a second substrate disposed opposite to each other, a first electrode and a second electrode respectively disposed on sides of the first substrate and the second substrate facing each other, a first alignment layer and a second alignment layer respectively disposed on sides of the first electrode and the second electrode facing each other, and a dye liquid crystal layer located between the first alignment layer and the second alignment layer, the first substrates of the functional sub-layers constitute a full-layer planar substrate, and the second substrates of the functional sub-layers constitute a full-layer planar substrate; and manufacturing patterns of the first electrodes of the functional sub-layers and patterns of the second electrodes of the functional sub-layers by adopting a sputtering deposition process or a laser etching process, so that one of the first electrodes or the second electrodes of the functional sub-layers are disposed at an interval, and the other one of the first electrodes or the second electrodes of the functional sub-layers are disposed at an interval or constitute a full-layer planar electrode.

In some implementations, an interval between any two electrodes in different regions is greater than or equal to 2 mm, and less than or equal to 4 mm, for example, greater than or equal to 1 mm, and less than or equal to 2 mm, so as to achieve an isolation between the electrodes in different regions.

In particular, the first substrates of the functional sub-layers may constitute a full-layer planar substrate, and the second substrates of the functional sub-layers may constitute a full-layer planar substrate, i.e., the functional sub-layers share a full-layer planar substrate as the first substrates thereof and share another full-layer planar substrate as the second substrates thereof. On this basis, the patterns of the first electrodes of the functional sub-layers and the patterns of the second electrodes of the functional sub-layers are both manufactured by adopting a sputtering deposition process or a laser etching process. For example, during manufacturing the entire layer structure of the light adjusting functional layer (which may be referred to as a dye liquid crystal mother substrate), a sputtering deposition process may be performed region by region on the entire layer of the substrates to directly deposit patterned electrodes (the first electrodes and/or the second electrodes) on the entire layer of the substrates (the first substrates and/or the second substrates), so that no subsequent cutting on the entire layer of the electrodes is desired. Alternatively, an entire layer of the electrodes may be deposited on the entire layer of the substrates and then is subjected to a laser etching process, which can also form the patterned electrodes. By adopting the method described above, the first substrates of the functional sub-layers can be a full-layer planar substrate not to be cut, and the substrates of the functional sub-layers can be a full-layer planar substrate not to be cut.

In summary, in the technical solutions of the embodiments of the present disclosure, by using the full-layer planar substrate as the common/shared substrate for the functional sub-layers, the light adjusting functional layer composed of the functional sub-layers can be made into an integrated structure, compared with the structure in which four independent functional sub-layers are spliced in the related art, during manufacturing the light adjusting module, the light adjusting functional layer is to be fixed on the protective layer through the full-layer transparent adhesive layer, in addition, in the case where the light adjusting module includes two light adjusting functional layers, the two light adjusting functional layers are to be fixed together by the full-layer transparent adhesive layer, and the functional sub-layers are not to be spliced, thereby avoiding the case where the alignment directions of the four functional sub-layers are confused after the four functional sub-layers being stacked in the related art, ensuring the alignment directions in different regions to be consistent, therefore, no differences in transmittance and chromaticity would occur at any viewing angle, and the uniformity of light adjusting can be improved. Moreover, since the functional sub-layers are not to be spliced, the number of functional sub-layers to be spliced can be reduced, the manufacturing cost can be reduced, and the production efficiency can be improved. On the basis of achieving the above-described effects, in order to realize light adjusting region by region, one of the first electrodes or the second electrodes of the functional sub-layers are disposed at an interval, and the other one of the first electrodes or the second electrodes of the functional sub-layers are disposed at an interval or constitute a single full-layer planar electrode, so that different voltages can be applied to the electrodes in different regions independently, thereby realizing light adjusting region by region.

It is to be understood that the above embodiments are merely exemplary embodiments that are employed to illustrate the principles of the present disclosure, which is not to be construed as limiting the present disclosure. It will be apparent to those skilled in the art that various modifications and improvements can be made without departing from the spirit and scope of the present disclosure, and such modifications and improvements are considered to be within the scope of the present disclosure.

The invention claimed is:

1. A light adjusting structure, comprising one or two light adjusting functional layers stacked, wherein each light adjusting functional layer comprises a plurality of functional sub-layers distributed in different regions, each functional sub-layer comprises a first substrate and a second substrate disposed opposite to each other, a first electrode and a second electrode respectively disposed on sides of the first substrate and the second substrate facing each other, a first alignment layer and a second alignment layer respectively disposed on sides of the first electrode and the second electrode facing each other, and a dye liquid crystal layer between the first alignment layer and the second alignment layer;

at least one of first substrates or second substrates of the functional sub-layers constitute a full-layer planar substrate, one of first electrodes or second electrodes of the functional sub-layers are disposed at an interval, and the other one of the first electrodes or the second electrodes of the functional sub-layers are disposed at an interval or constitute a full-layer planar electrode, dye liquid crystal layers of the functional sub-layers each comprise a sealant disposed between the first alignment layer and the second alignment layer in a surrounding mode, and dye molecules and liquid crystal molecules disposed in a space surrounded by the sealant, sealants of the functional sub-layers are disposed at an interval, and spaces surrounded by the sealants of the functional sub-layers are isolated from each other, wherein each of the first electrodes and the second electrodes of the functional sub-layers are provided with at least one bonding part, outside a transmittance adjusting region in which the electrodes are located, for bonding with a flexible circuit board, wherein each light adjusting functional layer comprises three functional sub-layers, and at least one of the first electrodes or the second electrodes of the functional sub-layers are disposed at an interval, and comprises a first electrode region, a second electrode region and a third electrode region, and the first electrode region and the second electrode region are disposed on a same side of the third electrode region, one bonding part is provided, and is disposed on a side of the first electrode region and the second electrode region away from the third electrode region, the third electrode region is provided with an extension part, and an end of the extension part passes through the interval between the first electrode region and the second electrode region and extends to the side where the bonding part is located, the bonding part comprises three bonding sub-parts which are spaced apart from each other, the first electrode region and the second electrode region, and the extension part are bonded with the flexible circuit board through the three bonding sub-parts respectively.

2. The light adjusting structure of claim 1, wherein, for two light adjusting functional layers stacked on top of each other, alignment directions of the first alignment layer and the second alignment layer of each functional sub-layer in one light adjusting functional layer are respectively a first direction and a second direction parallel to each other, alignment directions of the first alignment layer and the second alignment layer of each functional sub-layer in another light adjusting functional layer are respectively a third direction and a fourth direction parallel to each other.

3. The light adjusting structure of claim 2, wherein the first direction and the second direction are perpendicular to the third direction and the fourth direction.

4. The light adjusting structure of claim 1, wherein first alignment layers of the functional sub-layers are disposed at an interval, and the second alignment layers of the functional sub-layers are disposed at an interval, wherein an interval between one of the first electrodes or the second electrodes of the functional sub-layers is greater than or equal to 2 mm and less than or equal to 4 mm, an interval between the sealants of the functional sub-layers is greater than or equal to 2 mm and less than or equal to 4 mm, an interval between the first alignment layers of the functional sub-layers is greater than or equal to 2 mm and less than or equal to 4 mm, and an interval between the second alignment layers of the functional sub-layers is greater than or equal to 2 mm and less than or equal to 4 mm.

5. The light adjusting structure of claim 1, wherein a transparent insulating colloid is disposed in an interval between one of the first electrodes or the second electrodes of the functional sub-layers, and in an interval between the sealants of the functional sub-layers.

6. The light adjusting structure of claim 1, wherein the bonding part provided for the first electrodes of the functional sub-layers is a first electrode bonding part, the bonding part provided for the second electrode of the functional sub-layers is a second electrode bonding part, the second electrode bonding part is disposed opposite to the first electrode bonding part, the flexible circuit board has a contact part disposed between the first electrode bonding part and the second electrode bonding part, the contact part comprises a first contact surface and a second contact surface facing away from each other, the first contact surface faces the first electrode bonding part, and the second contact surface faces the second electrode bonding part, at least one first bonding terminal electrically contacting the first electrode bonding part is disposed on the first contact surface, and the first electrode of at least one of the functional sub-layers is electrically conducted with the flexible circuit board through at least one first bonding terminal, the second contact surface is provided with at least one second bonding terminal electrically contacting the second electrode bonding part, and the second electrode of at least one of the functional sub-layers is electrically conducted to the flexible circuit board through at least one second bonding terminal.

7. The light adjusting structure of claim 6, wherein a protective colloid is provided at an interface between the contact part and the first electrode bonding part, the second electrode bonding part.

8. The light adjusting structure of claim 1, wherein an interval between the extension part and each of the electrode regions that the extension part passes therethrough is greater than or equal to 40 μm and less than or equal to 80 μm.

9. A light adjusting module, comprising the light adjusting structure of claim 1, and a first protective layer and a second protective layer disposed opposite to each other, and the light adjusting structure is between the first protective layer and the second protective layer.

10. The light adjusting module of claim 9, wherein the light adjusting structure is fixed to the first protective layer and the second protective layer by two first transparent adhesive layers respectively, or, the light adjusting structure is fixed to the first protective layer through a first transparent adhesive layer, and the light adjusting structure and the second protective layer are disposed at an interval, the first transparent adhesive layer is a full-layer planar adhesive layer, wherein for two light adjusting functional layers stacked, the two light adjusting functional layers are fixed by a second transparent adhesive layer, the second transparent adhesive layer is a full-layer planar adhesive layer.

11. The light adjusting module of claim 9, wherein the first electrodes of the functional sub-layers are disposed at an interval, and the second electrodes of the functional sub-layers are disposed at an interval, the light adjusting module further comprises a plurality of first flexible circuit boards correspondingly bonded with the first electrodes of the functional sub-layers, and a plurality of second flexible circuit boards correspondingly bonded with the second electrodes of the functional sub-layers, or, the first electrodes of the functional sub-layers are disposed at an interval, and the second electrodes of the functional sub-layers constitute a full-layer planar electrode, the light adjusting module further comprises a plurality of first flexible circuit boards correspondingly bonded with the first electrodes of the functional sub-layers, and one second flexible circuit board bonded with the full-layer planar electrode.

12. The light adjusting module of claim 10, wherein the light adjusting structure is fixed to the first protective layer and the second protective layer by two first transparent adhesive layers respectively, the light adjusting structure comprises one light adjusting functional layer, the light adjusting module further comprises a sealant between the first protective layer and the second protective layer and surrounding the light adjusting structure, a buffer adhesive tape is provided between the sealant and the two first transparent adhesive layer in a surrounding mode.

13. The light adjusting module of claim 12, wherein the sealant has a thickness satisfying a following relationship:

$$T3 = T2 + 2 \times T1,$$

wherein T3 is the thickness of the sealant, T2 is a thickness of the light adjusting structure, T1 is a thickness of the buffer adhesive tape, and the thickness of the buffer adhesive tape is equal to a thickness of the first transparent adhesive layer.

14. The light adjusting module of claim 10, further comprising:
a transparent display panel, wherein the transparent display panel is disposed between the light adjusting structure and one of the first transparent adhesive layers, and is located in the region where one of the functional sub-layers of the light adjusting functional layer is located, and the first transparent adhesive layer is configured to eliminate a height difference between the transparent display panel and the light adjusting structure, and the transparent display panel is fixed to the light adjusting structure through a second transparent adhesive layer.

15. A light adjusting device, applied to any one of a lighting roof, a curtain wall, a passenger vehicle, a rail vehicle, an airplane and a ship, comprising the light adjusting module of claim 10.

16. A light adjusting structure, comprising one or two light adjusting functional layers stacked, wherein each light adjusting functional layer comprises a plurality of functional sub-layers distributed in different regions, each functional sub-layer comprises a first substrate and a second substrate disposed opposite to each other, a first electrode and a second electrode respectively disposed on sides of the first substrate and the second substrate facing each other, a first alignment layer and a second alignment layer respectively disposed on sides of the first electrode and the second electrode facing each other, and a dye liquid crystal layer between the first alignment layer and the second alignment layer;
at least one of first substrates or second substrates of the functional sub-layers constitute a full-layer planar substrate, one of first electrodes or second electrodes of the functional sub-layers are disposed at an interval, and the other one of the first electrodes or the second electrodes of the functional sub-layers are disposed at an interval or constitute a full-layer planar electrode, dye liquid crystal layers of the functional sub-layers each comprise a sealant disposed between the first alignment layer and the second alignment layer in a surrounding mode, and dye molecules and liquid crystal molecules disposed in a space surrounded by the sealant, sealants of the functional sub-layers are disposed at an interval, and spaces surrounded by the sealants of the functional sub-layers are isolated from each other,
wherein each of the first electrodes and the second electrodes of the functional sub-layers are provided with at least one bonding part, outside a transmittance adjusting region in which the electrodes are located, for bonding with a flexible circuit board,
wherein each light adjusting functional layer comprises three functional sub-layers, and at least one of the first electrodes or the second electrodes of the functional sub-layers are disposed at an interval, and comprises a first electrode region, a second electrode region and a third electrode region, and the first electrode region and the second electrode region are disposed on a same side of the third electrode region,
one bonding part is provided, and is disposed on a side of the first electrode region and the third electrode region away from the first electrode region or the second electrode region,
the first electrode region or the second electrode region is provided with an extension part, and an end of the extension part passes through the interval between the second electrode region and the third electrode region or the interval between the first electrode region and the third electrode region, and extends to the side where the bonding part is located,
the bonding part comprises three bonding sub-parts which are spaced apart from each other, the second electrode region, the third electrode region and the extension part, or, the first electrode region, the third electrode region and the extension part are bonded with the flexible circuit board through the three bonding sub-parts respectively.

17. A light adjusting structure, comprising one or two light adjusting functional layers stacked, wherein each light adjusting functional layer comprises a plurality of functional sub-layers distributed in different regions, each functional sub-layer comprises a first substrate and a second substrate disposed opposite to each other, a first electrode and a second electrode respectively disposed on sides of the first substrate and the second substrate facing each other, a first alignment layer and a second alignment layer respectively disposed on sides of the first electrode and the second electrode facing each other, and a dye liquid crystal layer between the first alignment layer and the second alignment layer;
at least one of first substrates or second substrates of the functional sub-layers constitute a full-layer planar substrate, one of first electrodes or second electrodes of the functional sub-layers are disposed at an interval, and the other one of the first electrodes or the second electrodes of the functional sub-layers are disposed at an interval or constitute a full-layer planar electrode, dye liquid crystal layers of the functional sub-layers each comprise a sealant disposed between the first alignment layer and the second alignment layer in a surrounding mode, and dye molecules and liquid crystal molecules disposed in a space surrounded by the sealant, sealants of the functional sub-layers are disposed at an interval, and spaces surrounded by the sealants of the functional sub-layers are isolated from each other,
wherein each of the first electrodes and the second electrodes of the functional sub-layers are provided with at least one bonding part, outside a transmittance adjusting region in which the electrodes are located, for bonding with a flexible circuit board,
wherein each light adjusting functional layer comprises three functional sub-layers, and at least one of the first electrodes or the second electrodes of the functional sub-layers are disposed at an interval, and comprises a first electrode region, a second electrode region and a third electrode region, and the first electrode region and the second electrode region are disposed on a same side of the third electrode region,
two bonding parts are provided, wherein one bonding part is a first bonding part and is disposed on a side, away from the third electrode region, of the first electrode region and the second electrode region, and the other bonding part is a second bonding part and is disposed on a side, away from the first electrode region or the second electrode region, of the third electrode region, the first bonding part comprises two bonding sub-parts which are spaced apart from each other, and the first electrode region and the second electrode region are respectively bonded with one flexible circuit board through the two bonding sub-parts, and the third electrode region is bonded to another flexible circuit board by the second bonding part.

* * * * *